United States Patent
Sibtain et al.

(10) Patent No.: US 11,142,634 B2
(45) Date of Patent: *Oct. 12, 2021

(54) SOLUTION POLYMERIZATION PROCESS

(71) Applicant: NOVA Chemicals (International) S.A., Fribourg (CH)

(72) Inventors: Fazle Sibtain, Calgary (CA); Christopher John Brooke Dobbin, Calgary (CA); Donald Gary Hartlen, Bright's Grove (CA); Kenneth Edward Taylor, Sarnia (CA); Hamidreza Khakdaman, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 7 days.

This patent is subject to a terminal disclaimer.

(21) Appl. No.: 16/751,328

(22) Filed: Jan. 24, 2020

(65) Prior Publication Data
US 2020/0165422 A1 May 28, 2020

Related U.S. Application Data

(62) Division of application No. 14/918,686, filed on Oct. 21, 2015, now Pat. No. 10,626,256.

(30) Foreign Application Priority Data

Oct. 21, 2014 (CA) .................... CA 2868640

(51) Int. Cl.
*C08L 23/08* (2006.01)
*C08J 5/00* (2006.01)
(Continued)

(52) U.S. Cl.
CPC .......... *C08L 23/0815* (2013.01); *B29C 41/04* (2013.01); *B29C 41/22* (2013.01); *B32B 3/266* (2013.01); *B32B 7/12* (2013.01); *B32B 27/08* (2013.01); *B32B 27/327* (2013.01); *B32B 27/34* (2013.01); *C08F 2/001* (2013.01); *C08F 2/06* (2013.01); *C08F 4/6555* (2013.01); *C08F 4/6583* (2013.01); *C08F 4/6585* (2013.01); *C08F 4/6592* (2013.01); *C08F 4/65904* (2013.01); *C08F 210/16* (2013.01); *C08J 5/00* (2013.01); *C08J 5/18* (2013.01); *C08L 23/08* (2013.01); *C08L 23/14* (2013.01); *C08L 23/20* (2013.01); *B29K 2023/08* (2013.01); *B29K 2105/0058* (2013.01); *B29K 2105/0085* (2013.01); *B29K 2105/0094* (2013.01); *B29K 2905/02* (2013.01); *B29K 2995/0063* (2013.01); *B29K 2995/0088* (2013.01); *B32B 2307/7265* (2013.01); *B32B 2439/40* (2013.01); *C08F 4/65908* (2013.01); *C08F 4/65912* (2013.01); *C08F 210/14* (2013.01); *C08F 2420/01* (2013.01); *C08F 2420/04* (2013.01); *C08F 2500/03* (2013.01); *C08F 2500/09* (2013.01); *C08F 2500/11* (2013.01); *C08F 2500/12* (2013.01); *C08F 2500/13* (2013.01); *C08F 2500/17* (2013.01); *C08F 2500/18* (2013.01); *C08F 2500/26* (2013.01); *C08J 2323/06* (2013.01); *C08J 2323/08* (2013.01); *C08J 2323/20* (2013.01); *C08J 2323/24* (2013.01); *C08J 2423/08* (2013.01); *C08J 2423/20* (2013.01); *C08J 2423/24* (2013.01); *C08L 2203/16* (2013.01); *C08L 2205/025* (2013.01);
(Continued)

(58) Field of Classification Search
CPC ...... C08L 23/0815; C08L 23/20; C08L 23/08; C08L 23/14; C08J 5/00; C08J 5/18; C08F 2/001; C08F 2/06; C08F 2/16; C08F 4/6592; C08F 4/6555; C08F 4/6583; C08F 4/65904; B29C 41/22; B29C 41/04; B32B 3/266; B32B 27/327; B32B 27/08; B32B 27/34; B32B 7/12
USPC .......................................................... 526/53
See application file for complete search history.

(56) References Cited

U.S. PATENT DOCUMENTS 4,105,609 A 8/1978 Machon et al.
4,379,882 A 4/1983 Miyata
(Continued)

OTHER PUBLICATIONS

Wild., L.; Ryle, T.R.; Knobelock, D.C. and Peat, I.R.; Determination of Branching Distributions in Polyethylene and Ethylene Copolymers; Journal of Polymer Science: Polymer Physics Edition, vol. 20, (1982), pp. 441-455.

(Continued)

*Primary Examiner* — Michael Bernshteyn
(74) *Attorney, Agent, or Firm* — Thomas J. Styslinger

(57) ABSTRACT

This disclosure relates to a continuous solution polymerization process wherein production rate is increased. Process solvent, ethylene, optional comonomers, optional hydrogen and a single site catalyst formulation are injected into a first reactor forming a first ethylene interpolymer. Process solvent, ethylene, optional comonomers, optional hydrogen and a heterogeneous catalyst formulation are injected into a second reactor forming a second ethylene interpolymer. The first and second reactors may be configured in series or parallel modes of operation. Optionally, a third ethylene interpolymer is formed in an optional third reactor, wherein an optional heterogeneous catalyst formulation may be employed. In a solution phase, the first, second and optional third ethylene interpolymers are combined, the catalyst is deactivated, the solution is passivated and following a phase separation process an ethylene interpolymer product is recovered.

24 Claims, 3 Drawing Sheets

(51) Int. Cl.

| | |
|---|---|
| C08F 2/00 | (2006.01) |
| C08F 4/65 | (2006.01) |
| B29C 41/22 | (2006.01) |
| C08F 2/06 | (2006.01) |
| B32B 3/26 | (2006.01) |
| B32B 27/32 | (2006.01) |
| C08J 5/18 | (2006.01) |
| C08L 23/20 | (2006.01) |
| B29C 41/04 | (2006.01) |
| C08F 210/16 | (2006.01) |
| B32B 7/12 | (2006.01) |
| B32B 27/08 | (2006.01) |
| B32B 27/34 | (2006.01) |
| C08L 23/14 | (2006.01) |
| C08F 4/6592 | (2006.01) |
| C08F 4/655 | (2006.01) |
| C08F 4/658 | (2006.01) |
| C08F 4/659 | (2006.01) |
| B29K 23/00 | (2006.01) |
| B29K 105/00 | (2006.01) |
| C08F 210/14 | (2006.01) |

(52) U.S. Cl.
CPC ....... *C08L 2205/03* (2013.01); *C08L 2205/06* (2013.01); *C08L 2314/02* (2013.01); *C08L 2314/06* (2013.01)

(56) References Cited

U.S. PATENT DOCUMENTS

| | | | |
|---|---|---|---|
| 4,731,438 A | 3/1988 | Bernier | |
| 4,803,259 A | 2/1989 | Zboril et al. | |
| 5,206,075 A | 4/1993 | Hodgson, Jr. | |
| 6,180,730 B1 | 1/2001 | Sibtain et al. | |
| 6,189,730 B1 * | 2/2001 | McClymonds | A47K 10/3818 221/197 |
| 6,277,931 B1 * | 8/2001 | Jaber | C08F 10/00 526/65 |
| 2009/0326169 A1 * | 12/2009 | Dams | C08F 210/16 526/64 |

OTHER PUBLICATIONS

ASTM D5748-95 (Reapproved 2012); Standard Test Method for Protrusion Puncture Resistance of Stretch Wrap Film; Copyright ASTM International, pp. 1-4.
ASTM D1709-09; Standard Test Methods for Impact Resistance of Plastic Film by the Free-Falling Dart Method; Copyright ASTM International; pp. 1-9.
ASTM D1922-09; Standard Test Method for Propagation Tear Resistance of Plastic Film and Thin Sheeting by Pendulum Method; Copyright ASTM International; pp. 1-7.
ASTM D2582-09; Standard Test Method for Puncture-Propagation Tear Resistance of Plastic Film and Thin Sheeting; Copyright ASTM International; pp. 1-5.
ASTM D882-12; Standard Test Method for Tensile Properties of Thin Plastic Sheeting; Copyright ASTM International; pp. 1-11.
ASTM D6474-12; Standard Test Method for Determining Molecular Weight Distribution and Molecular Weight Averages of Polyolefins by High Temperature Gel Permeation Chromatography; Copyright ASTM International; pp. 1-6.
ASTM D792-13; Standard Test Methods for Density and Specific Gravity (Relative Density) of Plastics by Displacement; Copyright ASTM International; pp. 1-6.
ASTM D1003-13; Standard Test Method for Haze and Luminous Transmittance of Transparent Plastics; Copyright ASTM International; pp. 1-7.
ASTM D1238-13; Standard Test Method for Melt Flow Rates of Thermoplastics by Extrusion Plastometer; Copyright ASTM International; pp. 1-16.
ASTM D2457-13; Standard Test Method for Specular Gloss of Plastic Films and Solid Plastics; Copyright ASTM International; pp. 1-6.
ASTM D1239-14; Standard Test Method for Resistance of Plastic Films to Extraction by Chemicals; Copyright ASTM International; pp. 1-3.

* cited by examiner

SOLUTION POLYMERIZATION PROCESS

CROSS REFERENCE TO RELATED PATENT APPLICATION

This application is a divisional of U.S. application Ser. No. 14/918,686, filed on Oct. 21, 2015, entitled "Solution Polymerization Process", which is herein incorporated by reference in its entirety.

FIELD

This discloses a polymerization process utilizing at least two reactors, at least one single-site catalyst formulation and at least one heterogeneous catalyst formulation. Using this process, polymer products are produced that are useful in manufactured articles.

BACKGROUND

Solution polymerization processes are typically carried out at temperatures that are above the melting point of the ethylene homopolymer or copolymer product. In a typical solution polymerization process, catalyst components, solvent, monomers and hydrogen are fed under pressure to one or more reactors.

For ethylene polymerization, or ethylene copolymerization, reactor temperatures can range from about 80° C. to about 300° C. while pressures generally range from about 3 MPag to about 45 MPag. The ethylene homopolymer or copolymer produced remains dissolved in the solvent under reactor conditions. The residence time of the solvent in the reactor is relatively short, for example, from about 1 second to about 20 minutes. The solution process can be operated under a wide range of process conditions that allow the production of a wide variety of ethylene polymers. Post reactor, the polymerization reaction is quenched to prevent further polymerization, by adding a catalyst deactivator, and passivated, by adding an acid scavenger. Once passivated, the polymer solution is forwarded to a polymer recovery operation where the ethylene homopolymer or copolymer is separated from process solvent, unreacted residual ethylene and unreacted optional α-olefin(s).

There is a need to improve the continuous solution polymerization process, for example, to increase the production rate (kilograms of ethylene homopolymer or copolymer produced per hour) and to improve energy efficiency by reducing the amount of energy consumed and greenhouse gas emissions.

SUMMARY OF DISCLOSURE

In an embodiment of a continuous solution polymerization process the first and second reactors are operated in series mode (i.e. the effluent from the first reactor flows into the second reactor), a homogeneous catalyst formulation is employed in the first reactor, a first heterogeneous catalyst formulations is employed in the second reactor and optionally a second heterogeneous catalyst formulation is employed in an optional third reactor. This embodiment of a continuous solution polymerization process comprises: i) injecting ethylene, a process solvent, a single site catalyst formulation, optionally one or more α-olefins and optionally hydrogen into a first reactor to produce a first exit stream containing a first ethylene interpolymer in process solvent; ii) passing the first exit stream into a second reactor and injecting into the second reactor, ethylene, process solvent, a first heterogeneous catalyst formulation, optionally one or more α-olefins and optionally hydrogen to produce a second exit stream containing a second ethylene interpolymer and the first ethylene interpolymer in process solvent; iii) passing the second exit stream into a third reactor and optionally injecting into the third reactor, ethylene, process solvent, one or more α-olefins, hydrogen and a second heterogeneous catalyst formulation to produce a third exit stream containing an optional third ethylene interpolymer, the second ethylene interpolymer and the first ethylene interpolymer in process solvent; iv) phase separating the third exit stream to recover an ethylene interpolymer product comprising the first ethylene interpolymer, the second ethylene interpolymer and the optional third ethylene interpolymer. The production rate of the continuous solution process is increased at least about 9% (measured in kilograms of ethylene interpolymer product produced per hour) relative to a continuous solution polymerization process where the first heterogeneous catalyst formulation and the optional second heterogeneous catalyst formulation are replaced with a single site catalyst formulation.

In another embodiment of a continuous solution polymerization process the first and second reactors are operated in series mode, a homogeneous catalyst formulation is employed in a first reactor, a first in-line Ziegler-Natta catalyst formulation is employed in a second reactor and an optional second in-line Ziegler-Natta catalyst formulation is employed in an optional third reactor. The production rate of this embodiment of the continuous solution process is increased at least about 9% relative to a continuous solution polymerization process where the first in-line Ziegler-Natta catalyst formulation and the optional second in-line Ziegler-Natta catalyst formulation are replaced with a single site catalyst formulation. The first and second in-line Ziegler-Natta catalyst formulation are formed in an in-line process comprising: i) forming a first product mixture in a first heterogeneous catalyst assembly by combining a stream S1 and a stream S2 and allowing the first product mixture to equilibrate for HUT-1 seconds; where stream S1 comprises a magnesium compound and an aluminum alkyl in process solvent and stream S2 comprises a chloride compound in process solvent; ii) forming a second product mixture in the first heterogeneous catalyst assembly by combining the first product mixture with a stream S3 and allowing the second product mixture to equilibrate for HUT-2 seconds; where stream S3 comprises a metal compound in process solvent; iii) forming the first and second in-line Ziegler-Natta catalyst formulation in the first heterogeneous catalyst assembly by combining the second product mixture with a stream S4 and allowing the first and second in-line Ziegler-Natta catalyst formulation to equilibrate for HUT-3 seconds prior to injection into the second reactor and optional injection into the third reactor, where stream S4 comprises an alkyl aluminum co-catalyst in process solvent; iv) optionally, step iii) is skipped and the first and second in-line Ziegler-Natta catalyst formulations are formed inside the second reactor and optionally inside the third reactor; where, the second product mixture is equilibrated for an additional HUT-3 seconds and injected into the second reactor and optionally injected into the third reactor, and stream S4 is independently injected into the second reactor and optionally into the third reactor. Optionally, the second in-line Ziegler-Natta catalyst formulation may be formed in a second heterogeneous catalyst assembly; i.e. steps i) through iii) and optional step iv) are conducted in the second heterogeneous catalyst assembly and the second in-line Ziegler-Natta catalyst formulation is injected into the third reactor.

In a further embodiment of a continuous solution polymerization process the first and second reactors are operated in series mode, a homogeneous catalyst formulation is employed in a first reactor, a first batch Ziegler-Natta catalyst formulation is employed in a second reactor and optionally a second batch Ziegler-Natta catalyst formulation is employed in an optional third reactor. A batch process is used to synthesize the first batch Ziegler-Natta catalyst formulation and optionally the second batch Ziegler-Natta catalyst formulation comprising: i) forming the first batch Ziegler-Natta catalyst formulation by combining a stream S5 and a stream S4 and injecting the first batch Ziegler-Natta catalyst formulation into the second reactor, where stream S4 comprises an alkyl aluminum co-catalyst in process solvent and stream S5 comprises a first batch Ziegler-Natta procatalyst in process solvent; ii) optionally forming the second batch Ziegler-Natta catalyst formulation by combining a stream S6 and stream S4 and optionally injecting the second batch Ziegler-Natta catalyst formulation into the third reactor, where stream S6 comprises a second batch Ziegler-Natta procatalyst; iii) optionally, steps i) and ii) are skipped and the first batch Ziegler-Natta catalyst formulation and the optional second batch Ziegler-Natta catalyst formulation are formed inside the reactors, where, stream S5 is injected into the second reactor and optionally stream S6 is injected into the third reactor and stream S4 is independently injected into the second reactor and optionally into the third reactor; iv) optionally said second batch Ziegler-Natta catalyst formulation is formed by combining stream S5 and stream S4 and optionally injecting said second batch Ziegler-Natta catalyst formulation into said third reactor; or said second batch Ziegler-Natta catalyst formulation is formed inside said third reactor by independently injecting stream S5 and stream S4 into said third reactor. In this embodiment the production rate of the continuous solution process is increased at least about 9% relative to a continuous solution polymerization process where the first batch Ziegler-Natta catalyst formulation and the optional second batch Ziegler-Natta catalyst formulation are replaced with a single site catalyst formulation.

In another embodiment of a continuous solution polymerization process the first and second reactors are operated in series mode, a homogeneous catalyst formulation is employed in a first reactor, a first heterogeneous catalyst formulation is employed in a second reactor and optionally a second heterogeneous catalyst formulation is employed in an optional third reactor and the catalysts are deactivated. Catalyst deactivation is accomplished in a process comprising: a) optionally adding a catalyst deactivator A to the second exit stream, downstream of the second reactor, forming a deactivated solution A; b) adding a catalyst deactivator B to the third exit stream, downstream of the third reactor, forming a deactivated solution B, with the proviso that step b) is skipped if catalyst deactivator A is added in step a), and; c) phase separating the deactivated solution A or B to recover the ethylene interpolymer product; wherein production rate is increased at least about 9% relative to a continuous solution polymerization process where said first heterogeneous catalyst formulation and the optional second heterogeneous catalyst formulation are replaced with the single site catalyst formulation In still another embodiment of a continuous solution polymerization process the first and second reactors are operated in parallel mode, i.e. the first exit stream (exiting the first reactor) by-passes the second reactor and the first exit stream is combined with the second exit stream (exiting the second reactor) downstream of the second reactor. This embodiment of a continuous solution polymerization process comprises: i) injecting ethylene, a process solvent, a single site catalyst formulation, optionally one or more α-olefins and optionally hydrogen into a first reactor to produce a first exit stream containing a first ethylene interpolymer in process solvent; ii) injecting ethylene, process solvent, a first heterogeneous catalyst formulation, optionally one or more α-olefins and optionally hydrogen into a second reactor to produce a second exit stream containing a second ethylene interpolymer in process solvent; iii) combining the first and second exit streams to form a third exit stream; iv) passing the third exit stream into a third reactor and optionally injecting into the third reactor, ethylene, process solvent, one or more α-olefins, hydrogen and a second heterogeneous catalyst formulation to produce a fourth exit stream containing an optional third ethylene interpolymer, the second ethylene interpolymer and the first ethylene interpolymer in said process solvent; v) phase separating the fourth exit stream to recover an ethylene interpolymer product comprising the first ethylene interpolymer, the second ethylene interpolymer and optionally the third ethylene interpolymer; wherein the production rate is increased at least about 9% relative to a continuous solution polymerization process where the first heterogeneous catalyst formulation and the optional second heterogeneous catalyst formulation are replaced with the single site catalyst formulation.

In another embodiment of a continuous solution polymerization process the first and second reactors are operated in parallel mode, a homogeneous catalyst formulation is employed in the first reactor, a first in-line Ziegler-Natta catalyst formulation is employed in the second reactor and an optional second in-line Ziegler-Natta catalyst formulation is optionally employed in the third reactor. The first and second in-line Ziegler-Natta catalyst formulations may be formed within a first heterogeneous catalyst assembly and injected into the second reactor and optionally into the third reactor, respectively; or, optionally the second in-line Ziegler-Natta catalyst formulation may be formed within a second heterogeneous catalyst assembly and optionally injected into the third reactor. In these embodiments the production rate of the continuous solution process is increased at least about 9% relative to a continuous solution polymerization process where the first in-line Ziegler-Natta catalyst formulation and the optional second in-line Ziegler-Natta catalyst formulation are replaced with a single site catalyst formulation.

In another embodiment of a continuous solution polymerization process the first and second reactors are operated in parallel mode, a homogeneous catalyst formulation is employed in the first reactor, a first batch Ziegler-Natta catalyst formulation is employed in the second reactor and optionally a second batch Ziegler-Natta catalyst formulation is employed in an optional third reactor. In this embodiment the production rate of the continuous solution process is increased at least about 9% relative to a continuous solution polymerization process where the first batch Ziegler-Natta catalyst formulation and the optional second batch Ziegler-Natta catalyst formulation are replaced with a single site catalyst formulation.

In a further embodiment of a continuous solution polymerization process the first and second reactors are operated in parallel mode, a homogeneous catalyst formulation is employed in the first reactor, a first heterogeneous catalyst formulation is employed in the second reactor and optionally a second heterogeneous catalyst formulation is employed in an optional third reactor and the catalysts are deactivated.

Catalyst deactivation is accomplished in a process comprising: a) optionally adding a catalyst deactivator A to the third exit stream, downstream of the second reactor, forming a deactivated solution A; b) adding a catalyst deactivator B to the fourth exit stream, downstream of the third reactor, forming a deactivated solution B, with the proviso that step b) is skipped if catalyst deactivator A is added in step a), and; c) phase separating the deactivated solution A or B to recover the ethylene interpolymer product; wherein, production rate is increased at least about 9% relative to a continuous solution polymerization process where the first heterogeneous catalyst formulation and the optional second heterogeneous catalyst formulation are replaced with the single site catalyst formulation.

In still another embodiment of a continuous solution polymerization process the first and second reactors are operated in parallel or series modes, a homogeneous catalyst formulation is employed in the first reactor, a first heterogeneous catalyst formulation is employed in the second reactor and optionally a second heterogeneous catalyst formulation is employed in an optional third reactor and deactivated solution A or B is passivated. The passivation process comprises: a) adding a passivator to deactivated solution A or B forming a passivated solution, and; b) phase separating the passivated solution to recover the ethylene interpolymer product; wherein, production rate is increased at least about 9% relative to a continuous solution polymerization process where the first heterogeneous catalyst formulation and optionally the second heterogeneous catalyst formulation are replaced with the single site catalyst formulation.

In some embodiments, the means for increasing the production rate of the ethylene interpolymer product at least about 9% involves the appropriate selection of catalyst formulations. Specifically, relative to a multi-reactor continuous solution polymerization process utilizing one or more single-site catalyst formulations, the production rate of the ethylene interpolymer product can be increased at least 9% if one of the single-site catalyst formulations is replaced with a heterogeneous catalyst formulation. In this embodiment an ethylene interpolymer product is produced using a continuous solution polymerization process comprising: (i) from about 15 weight percent to about 60 weight percent of a first ethylene interpolymer having a melt index from about 0.01 g/10 minutes to about 200 g/10 minutes and a density from about 0.855 g/cm$^3$ to about 0.975 g/cm$^3$; (ii) from about 30 weight percent to about 85 weight percent of a second ethylene interpolymer having a melt index from about 0.3 g/10 minutes to about 1000 g/10 minutes and a density from about 0.89 g/cm$^3$ to about 0.975 g/cm$^3$; (iii) optionally from about 0 weight percent to about 30 weight percent of a third ethylene interpolymer having a melt index from about 0.5 g/10 minutes to about 2000 g/10 minutes and a density from about 0.89 g/cm$^3$ to about 0.975 g/cm$^3$, and; (iv) a means for increasing the production rate of the ethylene interpolymer product by at least about 9%; and the ethylene interpolymer product is characterized as having, a melt index from about 0.3 g/10 minutes to about 500 g/10 minutes, a density from about 0.869 g/cm$^3$ to about 0.975 g/cm$^3$, a $M_w/M_n$ from about 2 to about 25 and a $CDBI_{50}$ from about 20% to about 97%.

Further embodiments of the present disclosure provide ethylene interpolymer products that can be converted into films, where the manufactured films have improvements in at least one or more of the following properties: processability, 45° gloss, haze, dart impact, machine direction tear, cross direction tear, machine direction secant modulus (1% and/or 2%), transverse direction secant modulus (1% and/or 2%), machine direction puncture-propagation tear resistance and transverse direction puncture-propagation tear resistance; relative to comparative films formed from comparative ethylene interpolymers.

BRIEF DESCRIPTION OF FIGURES

The following Figures are presented for the purpose of illustrating selected embodiments of this disclosure; it being understood, that the embodiments in this disclosure are not limited to the precise arrangement of, or the number of, vessels shown.

DEFINITION OF TERMS

Figure 1:
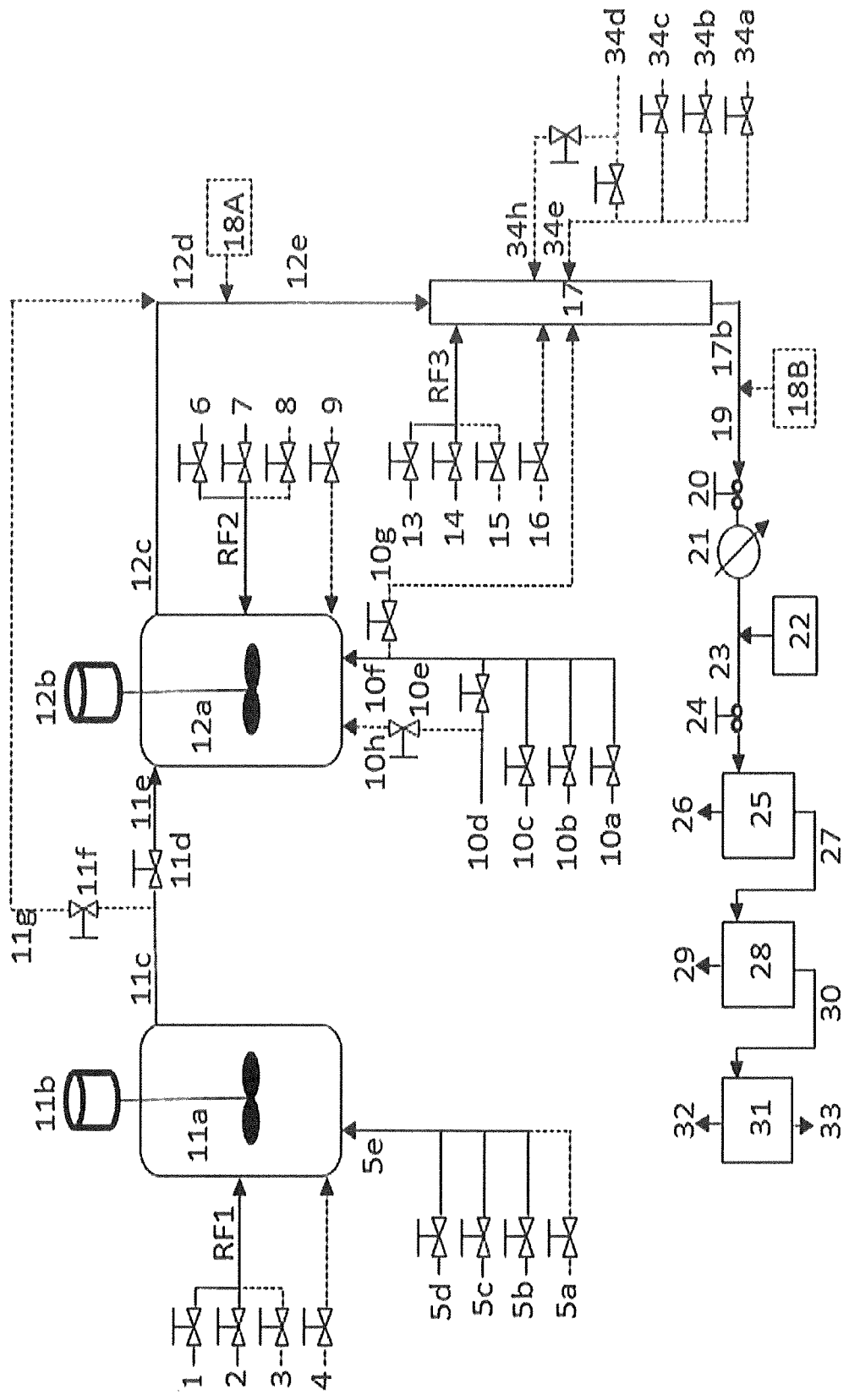
FIG. 1 illustrates a continuous solution polymerization process where an in-line heterogeneous catalyst formulation is employed and the production rate of ethylene interpolymer product is increased, relative to Process A.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using metallocene or single-site catalysts. Typically, homogeneous ethylene interpolymers have narrow molecular weight distributions, for example gel permeation chromatography (GPC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers.

It is well known to those skilled in the art, that homogeneous ethylene interpolymers are frequently further subdivided into "linear homogeneous ethylene interpolymers" and "substantially linear homogeneous ethylene interpolymers". These two subgroups differ in the amount of long chain branching: more specifically, linear homogeneous ethylene interpolymers have less than about 0.01 long chain branches per 1000 carbon atoms; while substantially linear ethylene interpolymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneous ethylene interpolymer" refers to both linear homogeneous ethylene interpolymers and substantially linear homogeneous ethylene interpolymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant therefrom; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "$^{R1}$" refers to a first reactor in a continuous solution polymerization process; it being understood that R1 is distinctly different from the symbol $R^1$; the latter is used in chemical formula, e.g. representing a hydrocarbyl group. Similarly, the term "R2" and it's superscript form "$^{R2}$" refers to a second reactor, and; the term "R3" and it's superscript form "$^{R3}$" refers to a third reactor.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

DETAILED DESCRIPTION

Catalysts

Organometallic catalyst formulations that are efficient in polymerizing olefins are well known in the art. In the embodiments disclosed herein, at least two catalyst formulations are employed in a continuous solution polymerization process. One of the catalyst formulations comprises at least one single-site catalyst formulation that produces a homogeneous first ethylene interpolymer. The other catalyst formulation comprises at least one heterogeneous catalyst formulation that produces a heterogeneous second ethylene interpolymer. Optionally a third ethylene interpolymer may be produced using the heterogeneous catalyst formulation that was used to produce the second ethylene interpolymer, or a different heterogeneous catalyst formulation may be used to produce the third ethylene interpolymer. In the continuous solution process, the at least one homogeneous ethylene interpolymer and the at least one heterogeneous ethylene interpolymer are solution blended and an ethylene interpolymer product is produced.

Single Site Catalyst Formulation

The catalyst components which make up the single site catalyst formulation are not particularly limited, i.e. a wide variety of catalyst components can be used. One non-limiting embodiment of a single site catalyst formulation comprises the following three or four components: a bulky ligand-metal complex; an alumoxane co-catalyst; an ionic activator and optionally a hindered phenol. In this disclosure, for example in Tables 1A through 4C, the term "component (i)" is refers to the bulky ligand-metal complex, the term "component (ii)" refers to the alumoxane co-catalyst, the term "component (iii)" refers to the ionic activator, and; the term "component (iv)" refers to the optional hindered phenol.

Non-limiting examples of component (i) are represented by formula (I):

$$i.(L^A)_a M(PI)_b (Q)_n \quad (I)$$

wherein ($L^A$) represents a bulky ligand; M represents a metal atom; PI represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of q-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

The phosphinimine ligand, PI, is defined by formula (II):

$$1.(R^p)_3 P=N— \quad (II)$$

wherein the $R^p$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —Si($R^s$)$_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —Ge($R^G$)$_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ arly or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

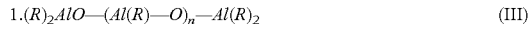

1.$(R)_2AlO—(Al(R)—O)_n—Al(R)_2$ (III)

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below;

1.$[R^5]^+[B(R^7)_4]^-$ (IV)

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula $—Si(R^9)_3$, where each $R^9$ is independently selected from hydrogen atoms and $C_{1-4}$ alkyl radicals, and; compounds of formula (V);

ii.$[(R^8)_tZH]^+[B(R^7)_4]^-$ (V)

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4, 5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4, 5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiarybutylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst formulation the quantity and mole ratios of the three or four components, (i) through (iv) are optimized as described below.

Heterogeneous Catalyst Formulations

A number of heterogeneous catalyst formulations are well known to those skilled in the art, including, as non-limiting examples, Ziegler-Natta and chromium catalyst formulations.

In this disclosure, embodiments are described where an in-line Ziegler-Natta catalyst formulation and a batch Ziegler-Natta catalyst formation are used. The term "in-line Ziegler-Natta catalyst formulation" refers to the continuous synthesis of a small quantity of active Ziegler-Natta catalyst and immediately injecting this catalyst into at least one continuously operating reactor, wherein the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, wherein an active catalyst polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In this disclosure, for example in Tables 1A through 4C, the term "component (v)" is equivalent to the magnesium compound, the term "component (vi)" is equivalent to the chloride compound, the term "component (vii)" is equivalent to the metal compound, the term "component (viii)" is equivalent to the alkyl aluminum co-catalyst and the term "component (ix)" is equivalent to the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

$$1.Al(R^4)_p(OR^5)_q(X)_r \qquad (VI)$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof.

To produce an active in-line Ziegler-Natta catalyst formulation the quantity and mole ratios of the five components, (v) through (ix), are optimized as described below.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

Solution Polymerization Process: In-Line Heterogeneous Catalyst Formulation

Figure 2:
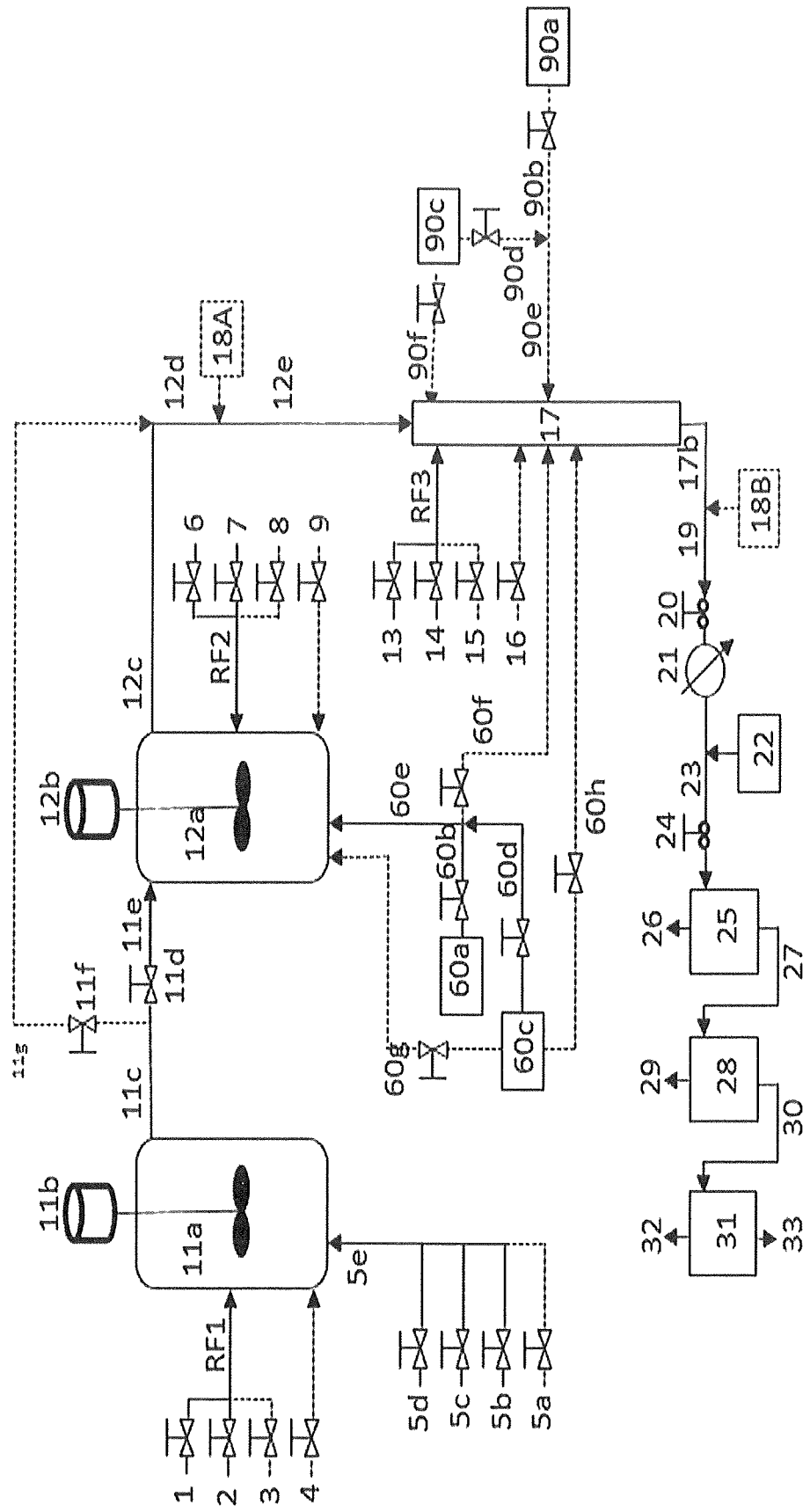
FIG. 2 illustrates a continuous solution polymerization process where a batch heterogeneous catalyst formulation is employed and the production rate of ethylene interpolymer product is increased, relative to Process A.
Figure 3:
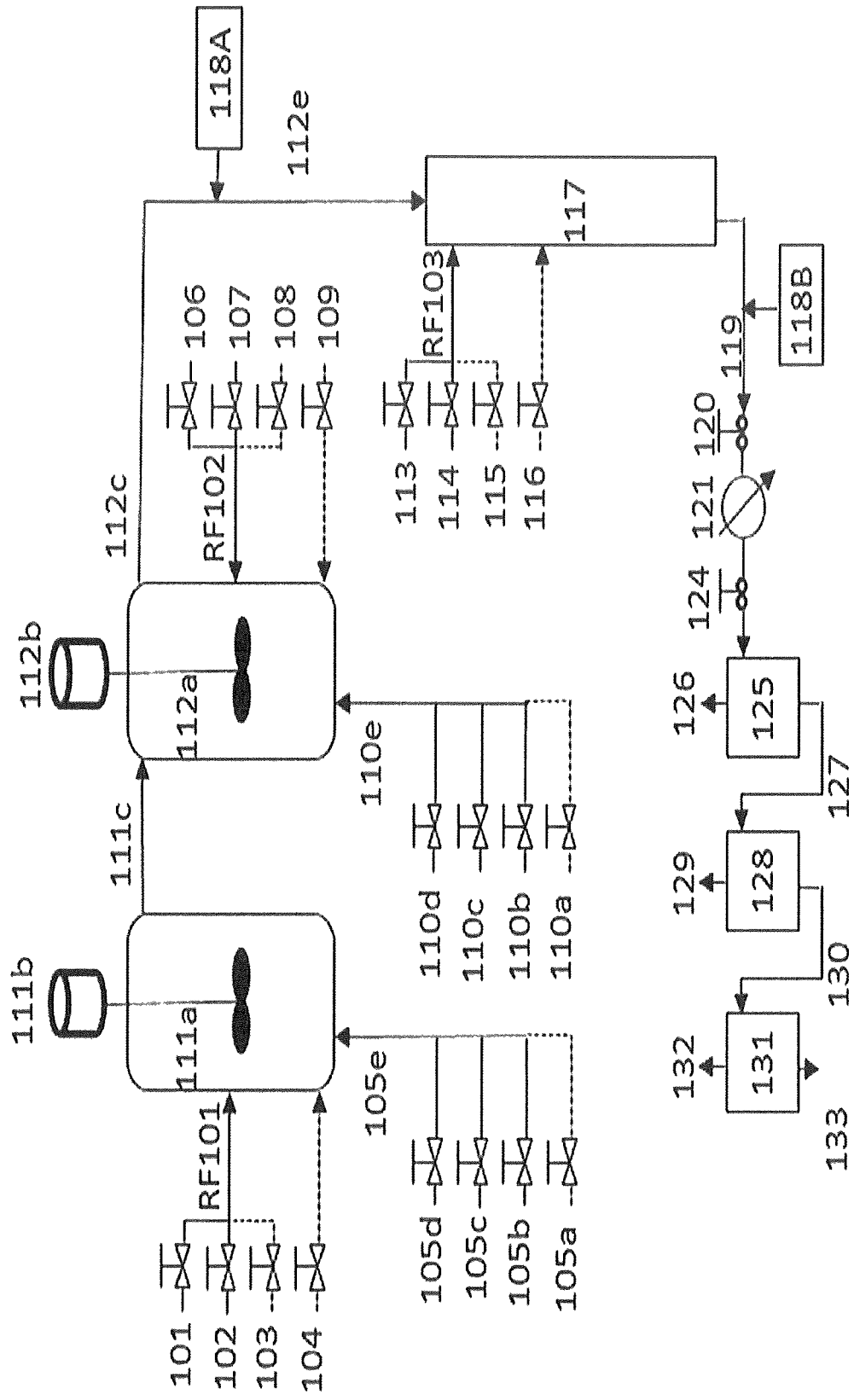
FIG. 3 illustrates Process A, a comparative continuous solution polymerization process where single-site catalyst formulations are employed.

Embodiments of the continuous solution polymerization process having an increased production rate are shown in FIGS. 1 and 2. FIGS. 1 and 2 are intended purely as examples and are not to be construed as limiting. A comparative continuous solution polymerization process, Process A, is shown in FIG. 3.

In an embodiment of the continuous solution polymerization process, process solvent, monomer(s) and a catalyst formulation are continuously fed to a reactor wherein the desired ethylene interpolymer is formed in solution. In FIG. 1, process solvent 1, ethylene 2 and optional α-olefin 3 are combined to produce reactor feed stream RF1 which flows into reactor 11a. In FIG. 1 optional streams, or optional embodiments, are denoted with dotted lines. It is not particularly important that combined reactor feed stream RF1 be formed; i.e. reactor feed streams can be combined in all possible combinations, including an embodiment where streams 1 through 3 are independently injected into reactor 11a. Optionally hydrogen may be injected into reactor 11a through stream 4; hydrogen is generally added to control the molecular weight of the first ethylene interpolymer produced in reactor 11a. Reactor 11a is continuously stirred by stirring assembly 11b which includes a motor external to the reactor and an agitator within the reactor. In the art, such a reactor is frequently called a CSTR (Continuously Stirred Tank Reactor).

A single site catalyst formulation is injected into reactor 11a through stream 5e. Single site catalyst component streams 5d, 5c, 5b and optional 5a refer to the ionic activator (component (iii)), the bulky ligand-metal complex (component (i)), the alumoxane co-catalyst (component (ii)) and optional hindered phenol (component (iv)), respectively. Single site catalyst component streams can be arranged in all possible configurations, including an embodiment where streams 5a through 5d are independently injected into reactor 11a. Each single site catalyst component is dissolved in a catalyst component solvent. Catalyst component solvents, for component (i) through (iv), may be the same or different. Catalyst component solvents are selected such that the combination of catalyst components does not produce a precipitate in any process stream; for example, precipitation of a single site catalyst component in stream 5e. The optimization of the single site catalyst formulation is described below.

Reactor 11a produces a first exit stream, stream 11c, containing the first ethylene interpolymer dissolved in process solvent, as well as unreacted ethylene, unreacted α-olefins (if present), unreacted hydrogen (if present), active single site catalyst, deactivated single site catalyst, residual catalyst components and other impurities (if present). Melt index ranges and density ranges of the first ethylene interpolymer produced are described below.

The continuous solution polymerization process shown in FIG. 1 includes two embodiments where reactors 11a and 12a can be operated in series or parallel modes. In series mode 100% of stream 11c (the first exit stream) passes through flow controller 11d forming stream 11e which enters reactor 12a. In contrast, in parallel mode 100% of stream 11c passes through flow controller 11f forming stream 11g. Stream 11g by-passes reactor 12a and is combined with stream 12c (the second exit stream) forming stream 12d (the third exit stream).

Fresh reactor feed streams are injected into reactor 12a; process solvent 6, ethylene 7 and optional α-olefin 8 are combined to produce reactor feed stream RF2. It is not important that stream RF2 is formed; i.e. reactor feed streams can be combined in all possible combinations, including independently injecting each stream into the reactor. Optionally hydrogen may be injected into reactor 12a through stream 9 to control the molecular weight of the second ethylene interpolymer. Reactor 12a is continuously stirred by stirring assembly 12b which includes a motor external to the reactor and an agitator within the reactor.

An in-line heterogeneous catalyst formulation is injected into reactor 12a through stream 10f and a second ethylene interpolymer is formed in reactor 12a. The components that comprise the in-line heterogeneous catalyst formulation are introduced through streams 10a, 10b, 10c and 10d. A first heterogeneous catalyst assembly, defined by the conduits and flow controllers associated with streams 10a-10h, is operated as described below. In the case of a Ziegler-Natta catalyst, the first heterogeneous catalyst assembly produces an efficient in-line Ziegler-Natta catalyst formulation by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate.

Stream 10a (stream S1 in claims) contains a binary blend of a magnesium compound, component (v) and an aluminum alkyl, component (ix), in process solvent. The upper limit on the (aluminum alkyl)/(magnesium compound) molar ratio in stream 10a may be about 70, in some cases about 50 and is other cases about 30. The lower limit on the (aluminum alkyl)/(magnesium compound) molar ratio may be about 3.0, in some cases about 5.0 and in other cases about 10. Stream 10b (stream S2 in claims) contains a solution of a chloride compound, component (vi), in process solvent. Stream 10b is combined with stream 10a and the intermixing of streams 10a and 10b produces a magnesium chloride catalyst support. To produce an efficient in-line Ziegler-Natta catalyst (efficient in olefin polymerization), the (chloride compound)/(magnesium compound) molar ratio is optimized. The upper limit on the (chloride compound)/-(magnesium compound) molar ratio may be about 4, in some cases about 3.5 and is other cases about 3.0. The lower limit on the (chloride compound)/(magnesium compound) molar ratio may be about 1.0, in some cases about 1.5 and in other cases about 1.9. The time between the addition of the chloride compound and the addition of the metal compound (component (vii)) via stream 10c (stream S3 in claims) is controlled; hereafter HUT-1 (the first Hold-Up-Time). HUT-1 is the time for streams 10a (stream S1 in claims) and 10b (stream S2 in claims) to equilibrate and form a magnesium chloride support. The upper limit on HUT-1 may be about 70 seconds, in some cases about 60 seconds and is other cases about 50 seconds. The lower limit on HUT-1 may be about 5 seconds, in some cases about 10 seconds and in other cases about 20 seconds. HUT-1 is controlled by adjusting the length of the conduit between stream 10b injection port and stream 10c injection port, as well as controlling the flow rates of streams 10a and 10b. The time between the addition of component (vii) and the addition of the alkyl aluminum co-catalyst, component (viii), via stream 10d (stream S4 in claims) is controlled; hereafter HUT-2 (the second Hold-Up-Time). HUT-2 is the time for the magnesium chloride support and stream 10c to react and equilibrate. The upper limit on HUT-2 may be about 50 seconds, in some cases about 35 seconds and is other cases about 25 seconds. The lower limit on HUT-2 may be about 2 seconds, in some cases about 6 seconds and in other cases about 10 seconds. HUT-2 is controlled by adjusting the length of the conduit between stream 10c injection port and stream 10d injection port, as well as controlling the flow rates of streams 10a, 10b and 10c. The quantity of the alkyl aluminum co-catalyst added is optimized to produce an efficient catalyst; this is accomplished by adjusting the (alkyl aluminum co-catalyst)/(metal compound) molar ratio, or (viii)/(vii) molar ratio. The upper limit on the (alkyl aluminum co-catalyst)/(metal compound) molar ratio may be about 10, in some cases about 7.5 and is other cases about 6.0. The lower limit on the (alkyl aluminum co-catalyst)/(metal compound) molar ratio may be 0, in some cases about 1.0 and in other cases about 2.0. In addition, the time between the addition of the alkyl aluminum co-catalyst (stream S4 in claims) and the injection of the in-line Ziegler-Natta catalyst formulation into reactor 12a is controlled; hereafter HUT-3 (the third Hold-Up-Time). HUT-3 is the time for stream 10d to intermix and equilibrate to form the in-line Ziegler Natta catalyst formulation. The upper limit on HUT-3 may be about 15 seconds, in some cases about 10 seconds and is other cases about 8 seconds. The lower limit on HUT-3 may be about 0.5 seconds, in some cases about 1 seconds and in other cases about 2 seconds. HUT-3 is controlled by adjusting the length of the conduit between stream 10d injection port and the catalyst injection port in reactor 12a, and by controlling the flow rates of streams 10a through 10d. As shown in FIG. 1, optionally, 100% of stream 10d, the alkyl aluminum co-catalyst, may be injected directly into reactor 12a via stream 10h. Optionally, a portion of stream 10d may be injected directly into reactor 12a via stream 10h and the remaining portion of stream 10d injected into reactor 12a via stream 10f.

As previously indicated, an equivalent term for reactor 12a is "R2". The quantity of in-line heterogeneous catalyst formulation added to R2 is expressed as the parts-permillion (ppm) of metal compound (component (vii)) in the reactor solution, hereafter "R2 (vii) (ppm)". The upper limit on R2 (vii) (ppm) may be about 10 ppm, in some cases about 8 ppm and in other cases about 6 ppm. The lower limit on R2 (vii) (ppm) in some cases may be about 0.5 ppm, in other cases about 1 ppm and in still other cases about 2 ppm. The (aluminum alkyl)/(metal compound) molar ratio in reactor 12a, or the (ix)/(vii) molar ratio, is also controlled. The upper limit on the (aluminum alkyl)/(metal compound) molar ratio in the reactor may be about 2, in some cases about 1.5 and is other cases about 1.0. The lower limit on the (aluminum alkyl)/(metal compound) molar ratio may be about 0.05, in some cases about 0.075 and in other cases about 0.1.

Any combination of the streams employed to prepare and deliver the in-line heterogeneous catalyst formulation to R2 may be heated or cooled, i.e. streams 10a through 10h (including stream 10g (optional R3 delivery) which is discussed below); in some cases the upper temperature limit of streams 10a through 10g may be about 90° C., in other cases about 80° C. and in still other cases about 70° C. and; in some cases the lower temperature limit may be about 20° C.; in other cases about 35° C. and in still other cases about 50° C.

Injection of the in-line heterogeneous catalyst formulation into reactor 12a produces a second ethylene interpolymer and a second exit stream 12c.

If reactors 11a and 12a are operated in a series mode, the second exit stream 12c contains the second ethylene interpolymer and the first ethylene interpolymer dissolved in process solvent; as well as unreacted ethylene, unreacted α-olefins (if present), unreacted hydrogen (if present), active catalysts, deactivated catalysts, catalyst components and other impurities (if present). Optionally the second exit stream 12c is deactivated by adding a catalyst deactivator A from catalyst deactivator tank 18A forming a deactivated solution A, stream 12e; in this case, FIG. 1 defaults to a dual reactor solution process. If the second exit stream 12c is not deactivated the second exit stream enters tubular reactor 17. Catalyst deactivator A is discussed below.

If reactors 11a and 12a are operated in parallel mode, the second exit stream 12c contains the second ethylene interpolymer dissolved in process solvent. The second exit stream 12c is combined with stream 11g forming a third exit stream 12d, the latter contains the second ethylene interpolymer and the first ethylene interpolymer dissolved in process solvent; as well as unreacted ethylene, unreacted α-olefins (if present), unreacted hydrogen (if present), active catalyst, deactivated catalyst, catalyst components and other impurities (if present). Optionally the third exit stream 12d is deactivated by adding catalyst deactivator A from catalyst deactivator tank 18A forming deactivated solution A, stream 12e; in this case, FIG. 1 defaults to a dual reactor solution process. If the third exit stream 12d is not deactivated the third exit stream 12d enters tubular reactor 17.

The term "tubular reactor" is meant to convey its conventional meaning, namely a simple tube; wherein the length/diameter (L/D) ratio is at least 10/1. Optionally, one or more of the following reactor feed streams may be injected into tubular reactor 17; process solvent 13, ethylene 14 and α-olefin 15. As shown in FIG. 1, streams 13, 14 and 15 may be combined forming reactor feed stream RF3 and the latter is injected into reactor 17. It is not particularly important that stream RF3 be formed; i.e. reactor feed streams can be combined in all possible combinations. Optionally hydrogen may be injected into reactor 17 through stream 16. Optionally, the in-line heterogeneous catalyst formulation may be injected into reactor 17 via catalyst stream 10g; i.e. a portion of the in-line heterogeneous catalyst enters reactor 12a through stream 10f and the remaining portion of the in-line heterogeneous catalyst enters reactor 17 through stream 10g.

FIG. 1 shows an additional embodiment where reactor 17 is supplied with a second heterogeneous catalyst formulation produced in a second heterogeneous catalyst assembly. The second heterogeneous catalyst assembly refers to the combination of conduits and flow controllers that include streams 34a-34e and 34h. The chemical composition of the first and second heterogeneous catalyst formulations may be the same, or different. In the case of a Ziegler-Natta catalyst, the second heterogeneous catalyst assembly produces a second in-line Ziegler-Natta catalyst formulation. For example, the catalyst components ((v) through (ix)), mole ratios and hold-up-times may differ in the first and second heterogeneous catalyst assemblies. Relative to the first heterogeneous catalyst assembly, the second heterogeneous catalyst assembly is operated in a similar manner, i.e. the second heterogeneous catalyst assembly generates an efficient catalyst by optimizing hold-up-times and the following molar ratios: (aluminum alkyl)/(magnesium compound), (chloride compound)/-(magnesium compound), (alkyl aluminum co-catalyst/(metal compound, and (aluminum alkyl)/(metal compound). To be clear: stream 34a contains a binary blend of magnesium compound (component (v)) and aluminum alkyl (component (ix)) in process solvent; stream 34b contains a chloride compound (component (vi)) in process solvent; stream 34c contains a metal compound (component (vii)) in process solvent, and; stream 34d contains an alkyl aluminum co-catalyst (component (viii)) in process solvent. Once prepared, the in-line Ziegler-Natta catalyst is injected into reactor 17 through stream 34e; optionally, additional alkyl aluminum co-catalyst is injected into reactor 17 through stream 34h. As shown in FIG. 1, optionally, 100% of stream 34d, the alkyl aluminum co-catalyst, may be injected directly into reactor 17 via stream 34h. Optionally, a portion of stream 34d may be injected directly into reactor 17 via stream 34h and the remaining portion of stream 34d injected into reactor 17 via stream 34e. In FIG. 1, the first or the second heterogeneous catalyst assembly supplies 100% of the catalyst to reactor 17. Any combination of the streams that comprise the second heterogeneous catalyst assembly may be heated or cooled, i.e. streams 34a-34e and 34h; in some cases the upper temperature limit of streams 34a-34e and 34h may be about 90° C., in other cases about 80° C. and in still other cases about 70° C. and; in some cases the lower temperature limit may be about 20° C.; in other cases about 35° C. and in still other cases about 50° C.

In reactor 17 a third ethylene interpolymer may, or may not, form. A third ethylene interpolymer will not form if catalyst deactivator A is added upstream of reactor 17 via catalyst deactivator tank 18A. A third ethylene interpolymer will be formed if catalyst deactivator B is added downstream of reactor 17 via catalyst deactivator tank 18B.

The optional third ethylene interpolymer produced in reactor 17 may be formed using a variety of operational modes; with the proviso that catalyst deactivator A is not added upstream of reactor 17. Non-limiting examples of operational modes include: (a) residual ethylene, residual optional α-olefin and residual active catalyst entering reactor 17 react to form the optional third ethylene interpolymer, or; (b) fresh process solvent 13, fresh ethylene 14 and optionally fresh α-olefin 15 are added to reactor 17 and the residual active catalyst entering reactor 17 forms the optional third ethylene interpolymer, or; (c) the fresh second in-line heterogeneous catalyst formulation is added to reactor 17 via stream 10g or stream 34e to polymerize residual ethylene and residual optional α-olefin to form the optional third ethylene interpolymer, or; (d) fresh process solvent 13, ethylene 14, optional α-olefin 15 and fresh second in-line heterogeneous catalyst formulation (10g or 34e) are added to reactor 17 to form the optional third ethylene interpolymer. Optionally, 100% of the alkyl aluminum co-catalyst may be added to reactor 17 via stream 34h, or a portion of the alkyl aluminum co-catalyst may be added to reactor 17 via stream 10g or 34h and the remaining portion added via stream 34h. Optionally fresh hydrogen 16 may be added to reduce the molecular weight of the optional third optional ethylene interpolymer.

In series mode, Reactor 17 produces a third exit stream 17b containing the first ethylene interpolymer, the second ethylene interpolymer and optionally a third ethylene interpolymer. As shown in FIG. 1, catalyst deactivator B may be added to the third exit stream 17b via catalyst deactivator tank 18B producing a deactivated solution B, stream 19; with the proviso that catalyst deactivator B is not added if catalyst deactivator A was added upstream of reactor 17. Deactivated solution B may also contain unreacted ethylene, unreacted optional α-olefin, unreacted optional hydrogen and impurities if present. As indicated above, if catalyst deactivator A was added, deactivated solution A (stream 12e) exits tubular reactor 17 as shown in FIG. 1.

In parallel mode operation, reactor 17 produces a fourth exit stream 17b containing the first ethylene interpolymer, the second ethylene interpolymer and optionally a third ethylene interpolymer. As indicated above, in parallel mode, stream 12d is the third exit stream. As shown in FIG. 1, in parallel mode, catalyst deactivator B is added to the fourth exit stream 17b via catalyst deactivator tank 18B producing a deactivated solution B, stream 19; with the proviso that catalyst deactivator B is not added if catalyst deactivator A was added upstream of reactor 17.

In FIG. 1, deactivated solution A (stream 12e) or B (stream 19) passes through pressure let down device 20, heat exchanger 21 and a passivator is added via tank 22 forming a passivated solution 23; the passivator is described below. The passivated solution passes through pressure let down device 24 and enters a first vapor/liquid separator 25. Hereafter, "V/L" is equivalent to vapor/liquid. Two streams are formed in the first V/L separator: a first bottom stream 27 comprising a solution that is rich in ethylene interpolymers and also contains residual ethylene, residual optional α-olefins and catalyst residues, and; a first gaseous overhead stream 26 comprising ethylene, process solvent, optional α-olefins, optional hydrogen, oligomers and light-end impurities if present.

The first bottom stream enters a second V/L separator 28. In the second V/L separator two streams are formed: a second bottom stream 30 comprising a solution that is richer in ethylene interpolymer and leaner in process solvent relative to the first bottom stream 27, and; a second gaseous overhead stream 29 comprising process solvent, optional α-olefins, ethylene, oligomers and light-end impurities if present.

The second bottom stream 30 flows into a third V/L separator 31. In the third V/L separator two streams are formed: a product stream 33 comprising an ethylene interpolymer product, deactivated catalyst residues and less than 5 weight % of residual process solvent, and; a third gaseous overhead stream 32 comprised essentially of process solvent, optional α-olefins and light-end impurities if present.

Product stream 33 proceeds to polymer recovery operations. Non-limiting examples of polymer recovery operations include one or more gear pump, single screw extruder or twin screw extruder that forces the molten ethylene interpolymer product through a pelletizer. A devolatilizing extruder may be used to remove small amounts of residual process solvent and optional α-olefin, if present. Once pelletized the solidified ethylene interpolymer product is typically dried and transported to a product silo.

The first, second and third gaseous overhead streams shown in FIG. 1 (streams 26, 29 and 32, respectively) are sent to a distillation column where solvent, ethylene and optional α-olefin are separated for recycling, or; the first, second and third gaseous overhead streams are recycled to the reactors, or; a portion of the first, second and third gaseous overhead streams are recycled to the reactors and the remaining portion is sent to a distillation column.

Solution Polymerization Process: Batch Heterogeneous Catalyst Formulation

Additional embodiment of the continuous solution process are shown in FIG. 2, where a first batch heterogeneous catalyst assembly (vessels and streams 60a through 60h) and an optional second batch heterogeneous catalyst assembly (vessels and streams 90a through 90f) are employed. For the sake of clarity and avoid any confusion, many of the vessels and streams shown in FIG. 2 are equivalent to the respective vessel and stream shown in FIG. 1; equivalence is indicated through the use of a consistent vessel or stream label, i.e. number. For the avoidance of doubt, referring to FIG. 2, process solvent is injected into CSTR reactor 11a, CSTR reactor 12a and tubular reactor 17 via streams 1, 6 and 13. Ethylene is injected into reactors 11a, 12a and 17 via streams 2, 7 and 14. Optional α-olefin is injected into reactors 11a, 12a and 17 via streams 3, 8 and 15. Optional hydrogen is injected into reactors 11a, 12a and 17 via streams 4, 9 and 16. A single-site catalyst formulation is injected into reactor 11a, producing the first ethylene interpolymer. Single-site catalyst component streams (5a through 5e) were described above. A batch Ziegler-Natta catalyst formulation or a batch Ziegler-Natta procatalyst is injected into reactor 12a via stream 60e and the second ethylene interpolymer is formed. Reactors 11a and 12a shown in FIG. 2 may be operated in series or parallel modes, as described in FIG. 1 above.

Processes to prepare batch heterogeneous procatalysts and in batch Ziegler-Natta procatalysts are well known to those skilled in the art. A non-limiting formulation useful in the continuous solution polymerization process may be prepared as follows. A batch Ziegler-Natta procatalyst may be prepared by sequentially added the following components to a stirred mixing vessel: (a) a solution of a magnesium compound (an equivalent term for the magnesium compound is "component (v)"); (b) a solution of a chloride compound (an equivalent term for the chloride compound is "component (vi)"; (c) optionally a solution of an aluminum alkyl halide, and; (d) a solution of a metal compound (an equivalent term for the metal compound is "component (vii)"). Suitable, non-limiting examples of aluminum alkyl halides are defined by the formula $(R^6)_v AlX_{3-v}$; wherein the $R^6$ groups may be the same or different hydrocarbyl group having from 1 to 10 carbon atoms, X represents chloride or bromide, and; v is 1 or 2. Suitable, non-limiting examples of the magnesium compound, the chloride compound and the metal compound were described earlier in this disclosure. Suitable solvents within which to prepare the procatalyst include linear or branched $C_5$ to $C_{12}$ alkanes or mixtures thereof. Individual mixing times and mixing temperatures may be used in each of steps (a) through (d). The upper limit on mixing temperatures for steps (a) through (d) in some case may be 160° C., in other cases 130° C. and in still other cases 100° C. The lower limit on mixing temperatures for steps (a) through (d) in some cases may be 10° C., in other cases 20° C. and in still other cases 30° C. The upper limit on mixing time for steps (a) through (d) in some case may be 6 hours, in other cases 3 hours and in still other cases 1 hour. The lower limit on mixing times for steps (a) through (d) in some cases may be 1 minute, in other cases 10 minutes and in still other cases 30 minutes.

Batch Ziegler-Natta procatalyst can have various catalyst component mole ratios. The upper limit on the (chloride compound)/(magnesium compound) molar ratio in some cases may be about 3, in other cases about 2.7 and is still other cases about 2.5; the lower limit in some cases may be about 2.0, in other cases about 2.1 and in still other cases about 2.2. The upper limit on the (magnesium compound)/(metal compound) molar ratio in some cases may be about 10, in other cases about 9 and in still other cases about 8; the lower limit in some cases may be about 5, in other cases about 6 and in still other cases about 7. The upper limit on the (aluminum alkyl halide)/(magnesium compound) molar ratio in some cases may be about 0.5, in other cases about 0.4 and in still other cases about 0.3; the lower limit in some cases may be 0, in other cases about 0.1 and in still other cases about 0.2. An active batch Ziegler-Natta catalyst formulation is formed when the procatalyst is combined with an alkyl aluminum co-catalyst. Suitable co-catalysts were described earlier in this disclosure. The procatalyst may be activated external to the reactor or in the reactor; in the latter case, the procatalyst and an appropriate amount of alkyl aluminum co-catalyst are independently injected R2 and optionally R3.

Once prepared the batch Ziegler-Natta procatalyst is pumped to procatalyst storage tank 60a shown in FIG. 2. Tank 60a may, or may not, be agitated. Storage tank 60c contains an alkyl aluminum co-catalyst; non-limiting examples of suitable alkyl aluminum co-catalysts were described earlier in this disclosure. A batch Ziegler Natta catalyst formulation stream 60e, that is efficient in converting olefins to polyolefins, is formed by combining batch Ziegler Natta procatalyst stream 60b (stream S5 in claims) with alkyl aluminum co-catalyst stream 60d (stream S4 in claims). Stream 60e is injected into reactor 12a where the second ethylene interpolymer is formed. Operationally, the following options may be employed: (a) 100% of the alkyl aluminum co-catalyst may be injected into reactor 12a through stream 60g, i.e. the batch Ziegler-Natta procatalyst is injected into reactor 12a through stream 60e, or; (b) a portion of the alkyl aluminum co-catalyst is injected into reactor 12a via stream 60g and the remaining portion passes through stream 60d where it combines with stream 60b forming the batch Ziegler-Natta catalyst formulation which is injected into reactor 12a via stream 60e.

Additional optional embodiments, where a batch heterogeneous catalyst formulation is employed, are shown in FIG. 2 where: (a) a batch Ziegler-Natta procatalyst is injected into tubular reactor 17 through stream 60f, or; (b) a batch Ziegler-Natta catalyst formulation is injected into tubular reactor 17 through stream 60f. In the case of option (a), 100% of the alkyl aluminum co-catalyst is injected directly into reactor 17 via stream 60h. An additional embodiment exists where a portion of the alkyl aluminum co-catalyst flows through stream 60f and the remaining portion flows through stream 60h. Any combination of tanks or streams 60a through 60h may be heated or cooled.

FIG. 2 includes additional embodiments where a second batch heterogeneous catalyst assembly, which is defined by vessels and streams 90a through 90f, may be used to optionally inject a second batch Ziegler-Natta catalyst formulation or a second batch Ziegler-Natta procatalyst into reactor 17. Once prepared the second batch Ziegler-Natta procatalyst is pumped to procatalyst storage tank 90a shown in FIG. 2. Tank 90a may, or may not, be agitated. Storage tank 90c contains an alkyl aluminum co-catalyst. A batch Ziegler Natta catalyst formulation stream 90e, that is efficient in converting olefins to polyolefins, is formed by combining the second batch Ziegler Natta procatalyst stream 90b (stream S6 in claims) with alkyl aluminum co-catalyst stream 90d (optionally stream S4 in claims). Stream 90e is optionally injected into reactor 17, wherein an optional third ethylene interpolymer may be formed. FIG. 2 includes additional embodiments where: (a) the batch Ziegler-Natta procatalyst is injected directly into reactor 17 through stream 90e and the procatalyst is activated inside reactor 17 by injecting 100% of the aluminum co-catalyst directly into rector 17 via stream 90f, or; (b) a portion of the aluminum co-catalyst may flow through stream 90e with the remaining portion flowing through stream 90f. Any combination of tanks or streams 90a through 90f may be heated or cooled.

The time between the addition of the alkyl aluminum co-catalyst (stream S4 in claims) and the injection of the batch Ziegler-Natta catalyst formulation into reactor 12a is controlled; hereafter HUT-4 (the fourth Hold-Up-Time). Referring to FIG. 2, HUT-4 is the time for stream 60d (stream S4 in claims) to intermix and equilibrate with stream 60b (batch Ziegler-Natta procatalyst) to form the batch Ziegler Natta catalyst formulation prior to injection into reactor 12a via in stream 60e. Optionally, HUT-4 is the time for stream 60d to intermix and equilibrate with stream 60b to from the batch Ziegler-Natta catalyst formulation prior to injection into the optional third reactor 17 via stream 60f, or; HUT-4 is the time for stream 90d to intermix and equilibrate with stream 90b to form the batch Ziegler-Natta catalyst formulation prior to injection into reactor 17 via stream 90e. The upper limit on HUT-4 may be about 300 seconds, in some cases about 200 seconds and in other cases about 100 seconds. The lower limit on HUT-4 may be about 0.1 seconds, in some cases about 1 seconds and in other cases about 10 seconds.

The quantity of batch Ziegler-Natta procatalyst produced and/or the size to procatalyst storage tanks 60a or 90a is not particularly important with respect to this disclosure. However, the large quantity of procatalyst produced allows one to operate the continuous solution polymerization plant for an extended period of time: the upper limit on this time in some cases may be about 3 months, in other cases for about 2 months and in still other cases for about 1 month; the lower limit on this time in some cases may be about 1 day, in other cases about 1 week and in still other cases about 2 weeks.

The quantity of batch Ziegler-Natta procatalyst or batch Ziegler-Natta catalyst formulation added to reactor 12a is expressed as "R2 (vii) (ppm)", i.e. the parts-per-million (ppm) of metal compound (component (vii)) in the reactor solution. The upper limit on R2 (vii) (ppm) may be about 10 ppm, in some cases about 8 ppm and in other cases about 6 ppm. The lower limit on R2 (vii) (ppm) may be about 0.5 ppm, in some cases about 1 ppm and in other cases about 2 ppm. The quantity of the alkyl aluminum co-catalyst added to reactor 12a is optimized to produce an efficient catalyst; this is accomplished by adjusting the (alkyl aluminum co-catalyst)/(metal compound) molar ratio. The upper limit on the (alkyl aluminum co-catalyst)/(metal compound)

molar ratio may be about 10, in some cases about 8.0 and is other cases about 6.0. The lower limit on the (alkyl aluminum co-catalyst)/(metal compound) molar ratio may be 0.5, in some cases about 0.75 and in other cases about 1.

Referring to FIG. 2, where the heterogeneous catalyst formulation is a Ziegler-Natta catalyst formulation, a third ethylene interpolymer may optionally be formed in reactor 17 by: (a) injecting the first batch Ziegler-Natta catalyst formulation or the first batch Ziegler-Natta procatalyst into reactor 17 through stream 60f, or; (b) injecting a chemically distinct second batch Ziegler-Natta catalyst formulation or second batch Ziegler-Natta procatalyst into reactor 17 through stream 90e. As shown in FIG. 2, the first batch Ziegler-Natta catalyst formulation may be deactivated upstream of reactor 17 by adding catalyst deactivator A via deactivator tank 18A to form a deactivated solution A (stream 12e), or; the first batch Ziegler-Natta catalyst formulation and optionally the second batch Ziegler-Natta catalyst formulation may be deactivated downstream of reactor 17 by adding catalyst deactivator B via deactivator tank 18B to form a deactivated solution B (stream 19). Deactivated solution A or B then pass through pressure let down device 20, heat exchange 21 and a passivator may be added via tank 22 forming passivated solution 23. The remaining vessels (24, 25, 28 and 31) and streams (26, 27, 29, 39, 32 and 33) and process conditions have been described previously. The ethylene interpolymer product stream 33 proceeds to polymer recovery. The first, second and third gaseous overhead streams shown in FIG. 2 (streams 26, 29 and 32, respectively) are sent to a distillation column where solvent, ethylene and optional α-olefin are separated for later use, or; the first, second and third gaseous overhead streams are recycled to the reactors, or; a portion of the first, second and third gaseous overhead streams are recycled to the reactors and the remaining portion is sent to a distillation column.

Process A: Comparative Continuous Solution Polymerization Process

A comparative continuous solution polymerization process, Process A, is shown in FIG. 3. Process A differs in that a single site catalyst formulation is injected into the second reactor 112a (R2); i.e. a heterogeneous catalyst formulation is not used. Reactors 111a and 112a include stirring assemblies 111b and 112b, respectively, which include a motor external to the reactor and an agitator within the reactor.

Referring to FIG. 1, the purpose of similarly situated vessels and streams shown in FIG. 3 are apparent. For the avoidance of doubt, in FIG. 3, process solvent is injected into reactors 111a, 112a and 117 via streams 101, 106 and 113. Ethylene is injected into reactors 111a, 112a and 117 via streams 102, 107 and 114. Optional α-olefin is injected into reactors 111a, 112a and 117 via streams 103, 108 and 115. As shown in FIG. 3, the process solvent, ethylene and optional α-olefin feed streams are combined to form reactor feed streams RF101, RF102 and RF103, that feed reactors 111a, 112a and 117, respectively. Optional hydrogen is injected into reactors 111a, 112a and 117 via streams 104, 109 and 116.

A single site catalyst formulation is injected into reactors 111a and 112a via streams 105e and 110e, respectively. A first and second ethylene interpolymer are produced in reactors 111a and 112a, respectively. Catalyst streams 105d and 110d contain an ionic activator dissolved in a catalyst component solvent. Catalyst streams 105c and 110c contain a bulky ligand-metal complex dissolved in a catalyst component solvent. Catalyst streams 105b and 110b contain an alumoxane co-catalyst dissolved in a catalyst component solvent. Optional catalyst streams 105a and 110a contain a hindered phenol dissolved in a catalyst component solvent. Catalyst component solvents for the various catalyst components may be the same or different.

In the comparative continuous solution polymerization process shown in FIG. 3, reactor 111a produces exit stream 111c which flows into reactor 112a. Reactor 112a produces an exit stream 112c. Optionally, exit stream 112c is deactivated by adding catalyst deactivator A from catalyst deactivator tank 118A forming deactivated stream 112e; in this case, Process A, shown in FIG. 3 defaults to a dual reactor solution process.

If exit stream 112c is not deactivated, stream 112c enters tubular reactor 117. In tubular reactor 117, an optional third ethylene interpolymer may, or may not form. A third ethylene interpolymer will not form if catalyst deactivator A is added upstream of reactor 117, i.e. deactivated stream 112e enters reactor 117.

A third ethylene interpolymer will form if catalyst deactivator A is not added, i.e. exit stream 112c enters reactor 117. As shown in the Examples section of this disclosure, regardless of the volume of reactor 117 (R3), the ethylene interpolymer production rate was essentially constant, e.g. the production rates of Examples 1 and 2 produced with comparative Process A were 81.1 kg/hr and 80.6 kg/hr, respectively; when the volume of R3 was 0.58 gallons (2.2 L) and 4.8 gallons (18 L), respectively.

Downstream of reactor 117, catalyst deactivator B is added via catalyst deactivator tank 118B forming deactivated stream 119; with the proviso that catalyst deactivator B is not added if catalyst deactivator A was added upstream of reactor 117.

Deactivated stream 112e or deactivated stream 119 passes through pressure let down device 120, heat exchanger 121, pressure let down device 124 and enters V/L separator 125. Two streams are formed in V/L separator 125, bottom stream 127 containing an ethylene polymer rich solution and gaseous overhead stream 126. Bottom stream 127 enters V/L separator 128 and two streams are formed, bottom stream 130 and gaseous overhead stream 129. Bottom stream 130 enters V/L separator 131 and two streams are formed, product stream 133 and gaseous overhead stream 132. Product stream 133 proceeds to polymer recovery. Gaseous overhead streams 126, 129 and 132 are sent to a distillation column where solvent, ethylene and optional α-olefin are separated and recycled to the solution polymerization process.

Optimization of the Single Site Catalyst Formulation

Referring to the embodiments shown in FIGS. 1 and 2; an active single site catalyst formulation is produced by optimizing the proportion of each of the four single site catalyst components, (i) through (iv). The term "active" means the single site catalyst formulation is very efficient in converting olefins to polyolefins; in practice the optimization objective is to maximize the following ratio: (pounds of ethylene interpolymer product produced)/(pounds of catalyst consumed). The quantity of bulky ligand metal complex, component (i), added to R1 is expressed as the parts per million (ppm) of component (i) in the total mass of the solution in R1; hereafter "R1 (i) (ppm)". The upper limit on R1 (i) (ppm) may be about 5, in some cases about 3 and is other cases about 2. The lower limit on R1 (i) (ppm) may be about 0.02, in some cases about 0.05 and in other cases about 0.1.

The proportion of catalyst component (iii), the ionic activator, added to R1 is optimized by controlling the (ionic activator)/(bulky ligand-metal complex) molar ratio in the R1 solution; hereafter "R1 (iii)/(i)". The upper limit on R1

(iii)/(i) may be about 10, in some cases about 5 and in other cases about 2. The lower limit on R1 (iii)/(i) may be about 0.1, in some cases about 0.5 and in other cases about 1.0. The proportion of catalyst component (ii) is optimized by controlling the (alumoxane)/(bulky ligand-metal complex) molar ratio in the R1 solution; hereafter "R1 (ii)/(i)". The alumoxane co-catalyst is generally added in a molar excess relative to the bulky ligand-metal complex. The upper limit on R1 (ii)/(i) may be about 1000, in some cases about 500 and is other cases about 200. The lower limit on R1 (ii)/(i) may be about 1, in some cases about 10 and in other cases about 30.

The addition of catalyst component (iv), the hindered phenol, to R1 is optional in the embodiments shown in FIGS. 1-2. If added, the proportion of component (iv) is optimized by controlling the (hindered phenol)/(alumoxane) molar ratio in R1; hereafter "R1 (iv)/(ii)". The upper limit on R1 (iv)/(ii) may be about 10, in some cases about 5 and in other cases about 2. The lower limit on R1 (iv)/(ii) may be 0.0, in some cases about 0.1 and in other cases about 0.2. The addition of catalyst component (iv) to R2 is not optional in the comparative solution process, Process A, shown in FIG. 3. The proportion of component (iv) is optimized by controlling the (hindered phenol)/(alumoxane) molar ratio in R2; hereafter "R2 (iv)/(ii)". The upper limit on R2 (iv)/(ii) may be about 10, in some cases about 5 and in other cases about 2; the lower limit on R2 (iv)/(ii) may be 0.01, in some cases about 0.1 and in other cases about 0.2.

Any combination of the single site catalyst component streams in FIGS. 1 and 2 (streams 5a-5e) may, or may not, be heated or cooled. The upper limit on catalyst component stream temperatures may be about 70° C.; in other cases about 60° C. and in still other cases about 50° C. The lower limit on catalyst component stream temperatures may be about 0° C.; in other cases about 20° C. and in still other cases about 40° C.

Additional Solution Polymerization Process Parameters

In the continuous solution processes embodiments shown in FIGS. 1 and 2 a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_5$-12 aliphatic hydrocarbons, e.g. pentane, methyl pentane, hexane, heptane, octane, cyclohexane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

It is well known to individuals experienced in the art that reactor feed streams (solvent, monomer, α-olefin, hydrogen, catalyst formulation etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

Referring to the first and second reactors in FIGS. 1 and 2 any combination of the CSTR reactor feed streams may be heated or cooled: more specifically, streams 1-4 (reactor 11a) and streams 6-9 (reactor 12a). The upper limit on reactor feed stream temperatures may be about 90° C.; in other cases about 80° C. and in still other cases about 70° C. The lower limit on reactor feed stream temperatures may be about 0° C.; in other cases about 10° C. and in still other cases about 20° C.

Any combination of the streams feeding the tubular reactor may be heated or cooled; specifically, streams 13-16 in FIGS. 1 and 2. In some cases, tubular reactor feed streams are tempered, i.e. the tubular reactor feed streams are heated to at least above ambient temperature. The upper temperature limit on the tubular reactor feed streams in some cases are about 200° C., in other cases about 170° C. and in still other cases about 140° C.; the lower temperature limit on the tubular reactor feed streams in some cases are about 60° C., in other cases about 90° C. and in still other cases about 120° C.; with the proviso that the temperature of the tubular reactor feed streams are lower than the temperature of the process stream that enters the tubular reactor.

In the embodiments shown in FIGS. 1 and 2 the operating temperatures of the solution polymerization reactors (vessels 11a (R1) and 12a (R2)) can vary over a wide range. For example, the upper limit on reactor temperatures in some cases may be about 300° C., in other cases about 280° C. and in still other cases about 260° C.; and the lower limit in some cases may be about 80° C., in other cases about 100° C. and in still other cases about 125° C. The second reactor, reactor 12a (R2), is operated at a higher temperature than the first reactor 11a (R1). The maximum temperature difference between these two reactors ($T^{R2}-T^{R1}$) in some cases is about 120° C., in other cases about 100° C. and in still other cases about 80° C.; the minimum ($T^{R2}-T^{R1}$) in some cases is about 1° C., in other cases about 5° C. and in still other cases about 10° C. The optional tubular reactor, reactor 17 (R3), may be operated in some cases about 100° C. higher than R2; in other cases about 60° C. higher than R2, in still other cases about 10° C. higher than R2 and in alternative cases 0° C. higher, i.e. the same temperature as R2. The temperature within optional R3 may increase along its length. The maximum temperature difference between the inlet and outlet of R3 in some cases is about 100° C., in other cases about 60° C. and in still other cases about 40° C. The minimum temperature difference between the inlet and outlet of R3 is in some cases may be 0° C., in other cases about 3° C. and in still other cases about 10° C. In some cases R3 is operated an adiabatic fashion and in other cases R3 is heated.

The pressure in the polymerization reactors should be high enough to maintain the polymerization solution as a single phase solution and to provide the upstream pressure to force the polymer solution from the reactors through a heat exchanger and on to polymer recovery operations. Referring to the embodiments shown in FIGS. 1 and 2, the operating pressure of the solution polymerization reactors can vary over a wide range. For example, the upper limit on reactor pressure in some cases may be about 45 MPag, in other cases about 30 MPag and in still other cases about 20 MPag; and the lower limit in some cases may be about 3 MPag, in other some cases about 5 MPag and in still other cases about 7 MPag.

Referring to the embodiments shown in FIGS. 1 and 2, prior to entering the first V/L separator, the passivated solution (stream 23) may have a maximum temperature in some cases of about 300° C., in other cases about 290° C. and in still other cases about 280° C.; the minimum temperature may be in some cases about 150° C., in other cases about 200° C. and in still other cases about 220° C. Immediately prior to entering the first V/L separator the passivated solution in some cases may have a maximum pressure of about 40 MPag, in other cases about 25 MPag and in still cases about 15 MPag; the minimum pressure in some cases may be about 1.5 MPag, in other cases about 5 MPag and in still other cases about 6 MPag.

The first V/L separator (vessel 25 in FIGS. 1 and 2) may be operated over a relatively broad range of temperatures and pressures. For example, the maximum operating temperature of the first V/L separator in some cases may be about 300° C., in other cases about 285° C. and in still other cases about 270° C.; the minimum operating temperature in some cases may be about 100° C., in other cases about 140° C. and in still other cases 170° C. The maximum operating pressure of the first V/L separator in some cases may be about 20 MPag, in other cases about 10 MPag and in still other cases about 5 MPag; the minimum operating pressure in some cases may be about 1 MPag, in other cases about 2 MPag and in still other cases about 3 MPag.

The second V/L separator (vessel 28 in FIGS. 1 and 2) may be operated over a relatively broad range of temperatures and pressures. For example, the maximum operating temperature of the second V/L separator in some cases may be about 300° C., in other cases about 250° C. and in still other cases about 200° C.; the minimum operating temperature in some cases may be about 100° C., in other cases about 125° C. and in still other cases about 150° C. The maximum operating pressure of the second V/L separator in some cases may be about 1000 kPag, in other cases about 900 kPag and in still other cases about 800 kPag; the minimum operating pressure in some cases may be about 10 kPag, in other cases about 20 kPag and in still other cases about 30 kPag.

The third V/L separator (vessel 31 in FIGS. 1 and 2) may be operated over a relatively broad range of temperatures and pressures. For example, the maximum operating temperature of the third V/L separator in some cases may be about 300° C., in other cases about 250° C., and in still other cases about 200° C.; the minimum operating temperature in some cases may be about 100° C., in other cases about 125° C. and in still other cases about 150° C. The maximum operating pressure of the third V/L separator in some cases may be about 500 kPag, in other cases about 150 kPag and in still other cases about 100 kPag; the minimum operating pressure in some cases may be about 1 kPag, in other cases about 10 kPag and in still other cases 25 about kPag.

Embodiments of the continuous solution polymerization process shown in FIGS. 1 and 2 show three V/L separators. However, continuous solution polymerization embodiments may include configurations comprising at least one V/L separator.

The ethylene interpolymer product produced in the continuous solution polymerization process may be recovered using conventional devolatilization systems that are well known to persons skilled in the art, non-limiting examples include flash devolatilization systems and devolatilizing extruders.

Any reactor shape or design may be used for reactor 11a (R1) and reactor 12a (R2) in FIGS. 1 and 2; non-limiting examples include unstirred or stirred spherical, cylindrical or tank-like vessels, as well as tubular reactors or recirculating loop reactors. At commercial scale the maximum volume of R1 in some cases may be about 20,000 gallons (about 75,710 L), in other cases about 10,000 gallons (about 37,850 L) and in still other cases about 5,000 gallons (about 18,930 L). At commercial scale the minimum volume of R1 in some cases may be about 100 gallons (about 379 L), in other cases about 500 gallons (about 1,893 L) and in still other cases about 1,000 gallons (about 3,785 L). At pilot plant scales reactor volumes are typically much smaller, for example the volume of R1 at pilot scale could be less than about 2 gallons (less than about 7.6 L). In this disclosure the volume of reactor R2 is expressed as a percent of the volume of reactor R1. The upper limit on the volume of R2 in some cases may be about 600% of R1, in other cases about 400% of R1 and in still other cases about 200% of R1. For clarity, if the volume of R1 is 5,000 gallons and R2 is 200% the volume of R1, then R2 has a volume of 10,000 gallons. The lower limit on the volume of R2 in some cases may be about 50% of R1, in other cases about 100% of R1 and in still other cases about 150% of R1. In the case of continuously stirred tank reactors the stirring rate can vary over a wide range; in some cases from about 10 rpm to about 2000 rpm, in other cases from about 100 to about 1500 rpm and in still other cases from about 200 to about 1300 rpm. In this disclosure the volume of R3, the tubular reactor, is expressed as a percent of the volume of reactor R2. The upper limit on the volume of R3 in some cases may be about 500% of R2, in other cases about 300% of R2 and in still other cases about 100% of R2. The lower limit on the volume of R3 in some cases may be about 3% of R2, in other cases about 10% of R2 and in still other cases about 50% of R2.

The "average reactor residence time", a commonly used parameter in the chemical engineering art, is defined by the first moment of the reactor residence time distribution; the reactor residence time distribution is a probability distribution function that describes the amount of time that a fluid element spends inside the reactor. The average reactor residence time can vary widely depending on process flow rates and reactor mixing, design and capacity. The upper limit on the average reactor residence time of the solution in R1 in some cases may be about 600 seconds, in other cases about 360 seconds and in still other cases about 180 seconds. The lower limit on the average reactor residence time of the solution in R1 in some cases may be about 10 seconds, in other cases about 20 seconds and in still other cases about 40 seconds. The upper limit on the average reactor residence time of the solution in R2 in some cases may be about 720 seconds, in other cases about 480 seconds and in still other cases about 240 seconds. The lower limit on the average reactor residence time of the solution in R2 in some cases may be about 10 seconds, in other cases about 30 seconds and in still other cases about 60 seconds. The upper limit on the average reactor residence time of the solution in R3 in some cases may be about 600 seconds, in other cases about 360 seconds and in still other cases about 180 seconds. The lower limit on the average reactor residence time of the solution in R3 in some cases may be about 1 second, in other cases about 5 seconds and in still other cases about 10 seconds.

Optionally, additional reactors (e.g. CSTRs, loops or tubes, etc.) could be added to the continuous solution polymerization process embodiments shown in FIGS. 1 and 2. In this disclosure, the number of reactors is not particularly important; with the proviso that the continuous solution polymerization process comprises at least two reactors that employ at least one single-site catalyst formulation and at least one heterogeneous catalyst formulation.

In operating the continuous solution polymerization process embodiments shown in FIGS. 1 and 2 the total amount of ethylene supplied to the process can be portioned or split between the three reactors R1, R2 and R3. This operational variable is referred to as the Ethylene Split (ES), i.e. "$ES^{R1}$", "$ES^{R2}$" and "$ES^{R3}$" refer to the weight percent of ethylene injected in R1, R2 and R3, respectively; with the proviso that $ES^{R1} ES^{R2}+ES^{R3}=100\%$. This is accomplished by adjusting the ethylene flow rates in the following streams: stream 2 (R1), stream 7 (R2) and stream 14 (R3). The upper limit on $ES^{R1}$ in some cases is about 60%, in other cases about 55% and in still other cases about 50%; the lower limit on $ES^{R1}$ in some cases is about 10%, in other cases about 15% and in still other cases about 20%. The upper limit on $ES^{R2}$ in some cases is about 90%, in other cases about 80% and in still other cases about 70%; the lower limit on $ES^{R2}$ in some cases is about 20%, in other cases about 30% and in still other cases about 40%. The upper limit on $ES^{R3}$ in some cases is about 30%, in other cases about 25% and in still other cases about 20%; the lower limit on $ES^{R3}$ in some cases is 0%, in other cases about 5% and in still other cases about 10%.

In operating the continuous solution polymerization process embodiments shown in FIGS. 1 and 2 the ethylene concentration in each reactor is also controlled. The ethylene concentration in reactor 1, hereafter $EC^{R1}$, is defined as the weight of ethylene in reactor 1 divided by the total weight of everything added to reactor 1; $EC^{R2}$ and $EC^{R3}$ are defined similarly. Ethylene concentrations in the reactors ($EC^{R1}$ or $EC^{R2}$ or $EC^{R3}$) in some cases may vary from about 7 weight percent (wt %) to about 25 wt %, in other cases from about 8 wt % to about 20 wt % and in still other cases from about 9 wt % to about 17 wt %.

In operating the continuous solution polymerization process embodiments shown in FIGS. 1 and 2 the total amount of ethylene converted in each reactor is monitored. The term "$Q^{R1}$" refers to the percent of the ethylene added to R1 that is converted into an ethylene interpolymer by the catalyst formulation. Similarly $Q^{R2}$ and $Q^{R3}$ represent the percent of the ethylene added to R2 and R3 that was converted into ethylene interpolymer, in the respective reactor. Ethylene conversions can vary significantly depending on a variety of process conditions, e.g. catalyst concentration, catalyst formulation, impurities and poisons. The upper limit on both $Q^{R1}$ and $Q^{R2}$ in some cases is about 99%, in other cases about 95% and in still other cases about 90%; the lower limit on both $Q^{R1}$ and $Q^{R2}$ in some cases is about 65%, in other cases about 70% and in still other cases about 75%. The upper limit on $Q^{R3}$ in some cases is about 99%, in other cases about 95% and in still other cases about 90%; the lower limit on $Q^{R3}$ in some cases is 0%, in other cases about 5% and in still other cases about 10%. The term "$Q^T$" represents the total or overall ethylene conversion across the entire continuous solution polymerization plant; i.e. $Q^T=100\times$[weight of ethylene in the interpolymer product]/([weight of ethylene in the interpolymer product]+[weight of unreacted ethylene]). The upper limit on $Q^T$ in some cases is about 99%, in other cases about 95% and in still other cases about 90%; the lower limit on $Q^T$ in some cases is about 75%, in other cases about 80% and in still other cases about 85%.

Optionally, α-olefin may be added to the continuous solution polymerization process. If added, α-olefin may be proportioned or split between R1, R2 and R3. This operational variable is referred to as the Comonomer Split (CS), i.e. "$CS^{R1}$", "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}=100\%$. This is accomplished by adjusting α-olefin flow rates in the following streams: stream 3 (R1), stream 8 (R2) and stream 15 (R3). The upper limit on $CS^{R1}$ in some cases is 100% (i.e. 100% of the α-olefin is injected into R1), in other cases about 95% and in still other cases about 90%. The lower limit on $CS^{R1}$ in some cases is 0% (ethylene homopolymer produced in R1), in other cases about 5% and in still other cases about 10%. The upper limit on $CS^{R2}$ in some cases is about 100% (i.e. 100% of the α-olefin is injected into reactor 2), in other cases about 95% and in still other cases about 90%. The lower limit on $CS^{R2}$ in some cases is 0%, in other cases about 5% and in still other cases about 10%. The upper limit on $CS^{R3}$ in some cases is 100%, in other cases about 95% and in still other cases about 90%. The lower limit on $CS^{R3}$ in some cases is 0%, in other cases about 5% and in still other cases about 10%.

First Ethylene Interpolymer

The first ethylene interpolymer is produced with a single-site catalyst formulation. Referring to the embodiments shown in FIGS. 1 and 2, if the optional α-olefin is not added to reactor 1 (R1), then the ethylene interpolymer produced in R1 is an ethylene homopolymer. If an α-olefin is added, the following weight ratio is one parameter to control the density of the first ethylene interpolymer: $((\alpha\text{-olefin})/(\text{ethylene}))^{R1}$. The upper limit on $((\alpha\text{-olefin})/(\text{ethylene}))^{R1}$ may be about 3; in other cases about 2 and in still other cases about 1. The lower limit on $((\alpha\text{-olefin})/(\text{ethylene}))^{R1}$ may be 0; in other cases about 0.25 and in still other cases about 0.5. Hereafter, the symbol "$\sigma^1$" refers to the density of the first ethylene interpolymer produced in R1. The upper limit on $\sigma^1$ may be about 0.975 g/cm$^3$; in some cases about 0.965 g/cm$^3$ and; in other cases about 0.955 g/cm$^3$. The lower limit on $\sigma^1$ may be about 0.855 g/cm$^3$, in some cases about 0.865 g/cm$^3$, and; in other cases about 0.875 g/cm$^3$.

Methods to determine the $CDBI_{50}$ (Composition Distribution Branching Index) of an ethylene interpolymer are well known to those skilled in the art. The $CDBI_{50}$, expressed as a percent, is defined as the percent of the ethylene interpolymer whose comonomer composition is within 50% of the median comonomer composition. It is also well known to those skilled in the art that the $CDBI_{50}$ of ethylene interpolymers produced with single-site catalyst formulations are higher relative to the $CDBI_{50}$ of α-olefin containing ethylene interpolymers produced with heterogeneous catalyst formulations. The upper limit on the $CDBI_{50}$ of the first ethylene interpolymer (produced with a single-site catalyst formulation) may be about 98%, in other cases about 95% and in still other cases about 90%. The lower limit on the $CDBI_{50}$ of the first ethylene interpolymer may be about 70%, in other cases about 75% and in still other cases about 80%.

As is well known to those skilled in the art the $M_w/M_n$ of ethylene interpolymers produced with single site catalyst formulations are lower relative to ethylene interpolymers produced with heterogeneous catalyst formulations. Thus, in the embodiments disclosed, the first ethylene interpolymer has a lower $M_w/M_n$ relative to the second ethylene interpolymer; where the second ethylene interpolymer is produced with a heterogeneous catalyst formulation. The upper limit on the $M_w/M_n$ of the first ethylene interpolymer may be about 2.8, in other cases about 2.5 and in still other cases about 2.2. The lower limit on the $M_w/M_n$ the first ethylene interpolymer may be about 1.7, in other cases about 1.8 and in still other cases about 1.9.

The first ethylene interpolymer contains catalyst residues that reflect the chemical composition of the single-site catalyst formulation used. Those skilled in the art will understand that catalyst residues are typically quantified by the parts per million of metal in the first ethylene interpolymer, where metal refers to the metal in component (i), i.e., the metal in the "bulky ligand-metal complex"; hereafter (and in the claims) this metal will be referred to "metal A". As recited earlier in this disclosure, non-limiting examples of metal A include Group 4 metals, titanium, zirconium and hafnium. The upper limit on the ppm of metal A in the first ethylene interpolymer may be about 1.0 ppm, in other cases about 0.9 ppm and in still other cases about 0.8 ppm. The lower limit on the ppm of metal A in the first ethylene interpolymer may be about 0.01 ppm, in other cases about 0.1 ppm and in still other cases about 0.2 ppm.

The amount of hydrogen added to R1 can vary over a wide range allowing the continuous solution process to produce first ethylene interpolymers that differ greatly in melt index, hereafter $I_2^1$ (melt index is measured at 190° C. using a 2.16 kg load following the procedures outlined in ASTM D1238). This is accomplished by adjusting the hydrogen flow rate in stream 4 (as shown in FIGS. 1 and 2). The quantity of hydrogen added to R1 is expressed as the parts-per-million (ppm) of hydrogen in R1 relative to the total mass in reactor R1; hereafter $H_2^{R1}$ (ppm). In some cases $H_2^{R1}$ (ppm) ranges from about 100 ppm to 0 ppm, in other cases from about 50 ppm to 0 ppm, in alternative cases from about 20 ppm to 0 ppm and in still other cases from about 2 ppm to 0 ppm. The upper limit on $I_2^1$ may be about 200 dg/min, in some cases about 100 dg/min; in other cases about 50 dg/min, and; in still other cases about 1 dg/min. The lower limit on $I_2^1$ may be about 0.01 dg/min, in some cases about 0.05 dg/min; in other cases about 0.1 dg/min, and; in still other cases about 0.5 dg/min.

The upper limit on the weight percent (wt %) of the first ethylene interpolymer in the ethylene interpolymer product may be about 60 wt %, in other cases about 55 wt % and in still other cases about 50 wt %. The lower limit on the wt % of the first ethylene interpolymer in the ethylene interpolymer product may be about 15 wt %; in other cases about 25 wt % and in still other cases about 30 wt %.

Second Ethylene Interpolymer

Referring to the embodiments shown in FIG. 1, if optional α-olefin is not added to reactor 12a (R2) either through fresh α-olefin stream 8 or carried over from reactor 11a (R1) in stream 11e (in series mode), then the ethylene interpolymer produced in reactor 12a (R2) is an ethylene homopolymer. If an optional α-olefin is present in R2, the following weight ratio is one parameter to control the density of the second ethylene interpolymer produced in R2: $((\alpha\text{-olefin})/(\text{ethylene}))^{R2}$. The upper limit on $((\alpha\text{-olefin})/(\text{ethylene}))^{R2}$ may be about 3; in other cases about 2 and in still other cases about 1. The lower limit on $((\alpha\text{-olefin})/(\text{ethylene}))^{R2}$ may be 0; in other cases about 0.25 and in still other cases about 0.5. Hereafter, the symbol "$\sigma^2$" refers to the density of the ethylene interpolymer produced in R2. The upper limit on $\sigma^2$ may be about 0.975 g/cm$^3$; in some cases about 0.965 g/cm$^3$ and; in other cases about 0.955 g/cm$^3$. Depending on the heterogeneous catalyst formulation used, the lower limit on $\sigma^2$ may be about 0.89 g/cm$^3$, in some cases about 0.90 g/cm$^3$, and; in other cases about 0.91 g/cm$^3$. The ranges disclosed in this paragraph also apply to the embodiments shown in FIG. 2.

A heterogeneous catalyst formulation is used to produce the second ethylene interpolymer. If the second ethylene interpolymer contains an α-olefin, the CDBI$_{50}$ of the second ethylene interpolymer is lower relative to the CDBI$_{50}$ of the first ethylene interpolymer that was produced with a single-site catalyst formulation. In an embodiment of this disclosure, the upper limit on the CDBI$_{50}$ of the second ethylene interpolymer (that contains an α-olefin) may be about 70%, in other cases about 65% and in still other cases about 60%. In an embodiment of this disclosure, the lower limit on the CDBI$_{50}$ of the second ethylene interpolymer (that contains an α-olefin) may be about 45%, in other cases about 50% and in still other cases about 55%. If an α-olefin is not added to the continuous solution polymerization process the second ethylene interpolymer is an ethylene homopolymer. In the case of a homopolymer, which does not contain α-olefin, one can still measure a CDBI$_{50}$ using TREF. In the case of a homopolymer, the upper limit on the CDBI$_{50}$ of the second ethylene interpolymer may be about 98%, in other cases about 96% and in still other cases about 95%, and; the lower limit on the CDBI$_{50}$ may be about 88%, in other cases about 89% and in still other cases about 90%. It is well known to those skilled in the art that as the α-olefin content in the second ethylene interpolymer approaches zero, there is a smooth transition between the recited CDBI$_{50}$ limits for the second ethylene interpolymers (that contain an α-olefin) and the recited CDBI$_{50}$ limits for the second ethylene interpolymers that are ethylene homopolymers.

The $M_w/M_n$ of second ethylene interpolymer is higher than the $M_w/M_n$ of the first ethylene interpolymer. The upper limit on the $M_w/M_n$ of the second ethylene interpolymer may be about 4.4, in other cases about 4.2 and in still other cases about 4.0. The lower limit on the $M_w/M_n$ of the second ethylene interpolymer may be about 2.2. $M_w/M_n$'s of 2.2 are observed when the melt index of the second ethylene interpolymer is high, or when the melt index of the ethylene interpolymer product is high, e.g. greater than 10 g/10 minutes. In other cases the lower limit on the $M_w/M_n$ of the second ethylene interpolymer may be about 2.4 and in still other cases about 2.6.

The second ethylene interpolymer contains catalyst residues that reflect the chemical composition of heterogeneous catalyst formulation. Those skilled in the art with understand that heterogeneous catalyst residues are typically quantified by the parts per million of metal in the second ethylene interpolymer, where the metal refers to the metal originating from component (vii), i.e. the "metal compound"; hereafter (and in the claims) this metal will be referred to as "metal B". As recited earlier in this disclosure, non-limiting examples of metal B include metals selected from Group 4 through Group 8 of the Periodic Table, or mixtures of metals selected from Group 4 through Group 8. The upper limit on the ppm of metal B in the second ethylene interpolymer may be about 12 ppm, in other cases about 10 ppm and in still other cases about 8 ppm. The lower limit on the ppm of metal B in the second ethylene interpolymer may be about 0.5 ppm, in other cases about 1 ppm and in still other cases about 3 ppm. While not wishing to be bound by any particular theory, in series mode of operation it is believed that the chemical environment within the second reactor deactivates the single site catalyst formulation, or; in parallel mode of operation the chemical environment within stream 12d deactivates the single site catalyst formation.

Referring to the embodiments shown in FIGS. 1 and 2, the amount of hydrogen added to R2 can vary over a wide range which allows the continuous solution process to produce second ethylene interpolymers that differ greatly in melt index, hereafter $I_2^2$. This is accomplished by adjusting the hydrogen flow rate in stream 9. The quantity of hydrogen added is expressed as the parts-per-million (ppm) of hydrogen in R2 relative to the total mass in reactor R2; hereafter $H_2^{R2}$ (ppm). In some cases $H_2^{R2}$ (ppm) ranges from about 50 ppm to 0 ppm, in some cases from about 25 ppm to 0 ppm, in other cases from about 10 to 0 and in still other cases from about 2 ppm to 0 ppm. The upper limit on $I_2^2$ may be about 1000 dg/min; in some cases about 750 dg/min; in other cases about 500 dg/min, and; in still other cases about 200 dg/min. The lower limit on $I_2^2$ may be about 0.3 dg/min, in some cases about 0.4 dg/min, in other cases about 0.5 dg/min, and; in still other cases about 0.6 dg/min.

The upper limit on the weight percent (wt %) of the second ethylene interpolymer in the ethylene interpolymer product may be about 85 wt %, in other cases about 80 wt % and in still other cases about 70 wt %. The lower limit on the wt % of the second ethylene interpolymer in the ethylene interpolymer product may be about 30 wt %; in other cases about 40 wt % and in still other cases about 50 wt %.

Third Ethylene Interpolymer

Referring to the embodiments shown in FIG. 1 a third ethylene interpolymer is not produced in reactor 17 (R3) if catalyst deactivator A is added upstream of reactor 17 via catalyst deactivator tank 18A. If catalyst deactivator A is not added and optional α-olefin is not added to reactor 17 either through fresh α-olefin stream 15 or carried over from reactor 12a (R2) in stream 12c (series mode) or stream 12d (parallel mode) then the ethylene interpolymer produced in reactor 17 is an ethylene homopolymer. If catalyst deactivator A is not added and optional α-olefin is present in R3, the following weight ratio determines the density of the third ethylene interpolymer: $((\alpha\text{-olefin})/(\text{ethylene}))^{R3}$. In the continuous solution polymerization process $((\alpha\text{-olefin})/(\text{ethylene}))^{R3}$ is one of the control parameter used to produce a third ethylene interpolymer with a desired density. The upper limit on $((\alpha\text{-olefin})/(\text{ethylene}))^{R3}$ may be about 3; in other cases about 2 and in still other cases about 1. The lower limit on $((\alpha\text{-olefin})/(\text{ethylene}))^{R3}$ may be 0; in other cases about 0.25 and in still other cases about 0.5. Hereafter, the symbol "$\sigma^3$" refers to the density of the ethylene interpolymer produced in R3. The upper limit on $\sigma^3$ may be about 0.975 g/cm³; in some cases about 0.965 g/cm³ and; in other cases about 0.955 g/cm³. Depending on the heterogeneous catalyst formulations used, the lower limit on $\sigma^3$ may be about 0.89 g/cm³, in some cases about 0.90 g/cm³, and; in other cases about 0.91 g/cm³. Optionally, a second heterogeneous catalyst formulation may be added to R3. The ranges disclosed in this paragraph also apply to the embodiments shown in FIG. 2.

Typically, the upper limit on the $CDBI_{50}$ of the optional third ethylene interpolymer (containing an α-olefin) may be about 65%, in other cases about 60% and in still other cases about 55%. The $CDBI_{50}$ of an α-olefin containing optional third ethylene interpolymer will be lower than the $CDBI_{50}$ of the first ethylene interpolymer produced with the single-site catalyst formulation. Typically, the lower limit on the $CDBI_{50}$ of the optional third ethylene interpolymer (containing an α-olefin) may be about 35%, in other cases about 40% and in still other cases about 45%. If an α-olefin is not added to the continuous solution polymerization process the optional third ethylene interpolymer is an ethylene homopolymer. In the case of an ethylene homopolymer the upper limit on the $CDBI_{50}$ may be about 98%, in other cases about 96% and in still other cases about 95%, and; the lower limit on the $CDBI_{50}$ may be about 88%, in other cases about 89% and in still other cases about 90%.

The upper limit on the $M_w/M_n$ of the optional third ethylene interpolymer may be about 5.0, in other cases about 4.8 and in still other cases about 4.5. The lower limit on the $M_w/M_n$ of the optional third ethylene interpolymer may be about 2.2, in other cases about 2.4 and in still other cases about 2.6. The $M_w/M_n$ of the optional third ethylene interpolymer is higher than the $M_w/M_n$ of the first ethylene interpolymer.

The catalyst residues in the optional third ethylene interpolymer reflect the chemical composition of the heterogeneous catalyst formulation(s) used, i.e. the first and optionally a second heterogeneous catalyst formulation. The chemical compositions of the first and second heterogeneous catalyst formulations may be the same or different; for example a first component (vii) and a second component (vii) may be used to synthesize the first and second heterogeneous catalyst formulation. As recited above, "metal B" refers to the metal that originates from the first component (vii). Hereafter, "metal C" refers to the metal that originates from the second component (vii). Metal B and optional metal C may be the same, or different. Non-limiting examples of metal B and metal C include metals selected from Group 4 through Group 8 of the Periodic Table, or mixtures of metals selected from Group 4 through Group 8. The upper limit on the ppm of (metal B+metal C) in the optional third ethylene interpolymer may be about 12 ppm, in other cases about 10 ppm and in still other cases about 8 ppm. The lower limit on the ppm of (metal B+metal C) in the optional third ethylene interpolymer may be about 0.5 ppm, in other cases about 1 ppm and in still other cases about 3 ppm.

Referring to the embodiments shown in FIGS. 1 and 2, optional hydrogen may be added to the tubular reactor (R3) via stream 16. The amount of hydrogen added to R3 may vary over a wide range. Adjusting the amount of hydrogen in R3, hereafter $H_2^{R3}$ (ppm), allows the continuous solution process to produce optional third ethylene interpolymers that differ widely in melt index, hereafter $I_2^3$. The amount of optional hydrogen added to R3 ranges from about 50 ppm to 0 ppm, in some cases from about 25 ppm to 0 ppm, in other cases from about 10 to 0 and in still other cases from about 2 ppm to 0 ppm. The upper limit on $I_2^3$ may be about 2000 dg/min; in some cases about 1500 dg/min; in other cases about 1000 dg/min, and; in still other cases about 500 dg/min. The lower limit on $I_2^3$ may be about 0.5 dg/min, in some cases about 0.6 dg/min, in other cases about 0.7 dg/min, and; in still other cases about 0.8 dg/min.

The upper limit on the weight percent (wt %) of the optional third ethylene interpolymer in the ethylene interpolymer product may be about 30 wt %, in other cases about 25 wt % and in still other cases about 20 wt %. The lower limit on the wt % of the optional third ethylene interpolymer in the ethylene interpolymer product may be 0 wt %; in other cases about 5 wt % and in still other cases about 10 wt %.

Ethylene Interpolymer Product

The upper limit on the density of the ethylene interpolymer product may be about 0.975 g/cm³; in some cases about 0.965 g/cm³ and; in other cases about 0.955 g/cm³. The lower limit on the density of the ethylene interpolymer product may be about 0.869 g/cm³, in some cases about 0.879 g/cm³, and; in other cases about 0.889 g/cm³.

The upper limit on the $CDBI_{50}$ of the ethylene interpolymer product may be about 97%, in other cases about 90% and in still other cases about 85%. An ethylene interpolymer product with a $CDBI_{50}$ of 97% may result if an α-olefin is not added to the continuous solution polymerization process; in this case, the ethylene interpolymer product is an ethylene homopolymer. The lower limit on the $CDBI_{50}$ of an ethylene interpolymer may be about 20%, in other cases about 40% and in still other cases about 60%.

The upper limit on the $M_w/M_n$ of the ethylene interpolymer product may be about 25, in other cases about 15 and in still other cases about 9. The lower limit on the $M_w/M_n$ of the ethylene interpolymer product may be 2.0, in other cases about 2.2 and in still other cases about 2.4.

The catalyst residues in the ethylene interpolymer product reflect the chemical compositions of: the single-site catalyst formulation employed in R1; the first heterogeneous catalyst formulation employed in R2, and; optionally the first and optionally the first and second heterogeneous catalyst formulation employed in R3. In this disclosure, catalyst residues were quantified by measuring the parts per million of a catalytic metal in the ethylene interpolymer products. Catalytic metals originate from two or optionally three sources, specifically: 1) "metal A" that originates from component (i) that was used to form the single-site catalyst formulation; (2) "metal B" that originates from the first component (vii) that was used to form the first heterogeneous catalyst formulation, and; (3) optionally "metal C" that originates from the second component (vii) that was used to form the optional second heterogeneous catalyst formulation. Metals A, B and C may be the same or different.

The upper limit on the ppm of metal A in the ethylene interpolymer product may be about 0.6 ppm, in other cases about 0.5 ppm and in still other cases about 0.4 ppm. The lower limit on the ppm of metal A in the ethylene interpolymer product may be about 0.001 ppm, in other cases about 0.01 ppm and in still other cases about 0.03 ppm. The upper limit on the ppm of (metal B+metal C) in the ethylene interpolymer product may be about 11 ppm, in other cases about 9 ppm and in still other cases about 7 ppm. The lower limit on the ppm of (metal B+metal C) in the ethylene interpolymer product may be about 0.2 ppm, in other cases about 0.4 ppm and in still other cases about 1 ppm.

In some embodiments, ethylene interpolymers may be produced where the catalytic metals (metal A, metal B and metal C) are the same metal; a non-limiting example would be titanium. In such embodiments, the ppm of (metal B+metal C) in the ethylene interpolymer product is calculated using equation (VII):

$$a.ppm^{B+C} = ((ppm^{(A+B+C)} - (f^A \times ppm^A))/(1-f^A)$$ (VII)

where: $ppm^{(B+c)}$ is the calculated ppm of (metal B+metal C) in the ethylene interpolymer product; $ppm^{(A+B+c)}$ is the total ppm of catalyst residue in the ethylene interpolymer product as measured experimentally, i.e. (metal A ppm+ metal B ppm+metal C ppm); $f^A$ represents the weight fraction of the first ethylene interpolymer in the ethylene interpolymer product, $f^A$ may vary from about 0.15 to about 0.6, and; $ppm^A$ represents the ppm of metal A in the first ethylene interpolymer. In equation (VII) $ppm^A$ is assumed to be 0.35 ppm.

Embodiments of the ethylene interpolymer products disclosed herein have lower catalyst residues relative the polyethylene polymers described in U.S. Pat. No. 6,277,931. Higher catalyst residues in U.S. Pat. No. 6,277,931 increase the complexity of the continuous solution polymerization process; an example of increased complexity includes additional purification steps to remove catalyst residues from the polymer. In contrast, in the present disclosure, catalyst residues are not removed. In this disclosure, the upper limit on the total ppm of catalyst residuals (metal A+metal B+optional metal C) in the ethylene interpolymer product may be about 12 ppm, in other cases about 9 ppm and in still other cases about 7, and; the lower limit on the total ppm of catalyst residuals (metal A+metal B+optional metal C) in the ethylene interpolymer product may be about 0.2 ppm, in other cases about 0.5 ppm and in still other cases about 1 ppm.

The upper limit on melt index of the ethylene interpolymer product may be about 500 dg/min, in some cases about 400 dg/min; in other cases about 300 dg/min, and; in still other cases about 200 dg/min. The lower limit on the melt index of the ethylene interpolymer product may be about 0.3 dg/min, in some cases about 0.4 dg/min; in other cases about 0.5 dg/min, and; in still other cases about 0.6 dg/min.

Catalyst Deactivation

In the continuous polymerization processes described in this disclosure, polymerization is terminated by adding a catalyst deactivator. Embodiments in FIGS. 1 and 2 show catalyst deactivation occurring either: (a) upstream of the tubular reactor by adding a catalyst deactivator A from catalyst deactivator tank 18A, or; (b) downstream of the tubular reactor by adding a catalyst deactivator B from catalyst deactivator tank 18B. Catalyst deactivator tanks 18A and 18B may contain neat (100%) catalyst deactivator, a solution of catalyst deactivator in a solvent, or a slurry of catalyst deactivator in a solvent. The chemical composition of catalyst deactivator A and B may be the same, or different. Non-limiting examples of suitable solvents include linear or branched $C_5$ to $C_{12}$ alkanes. In this disclosure, how the catalyst deactivator is added is not particularly important. Once added, the catalyst deactivator substantially stops the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.). In this disclosure the quantify of catalyst deactivator added was determined by the following catalyst deactivator molar ratio: 0.3≤(catalyst deactivator)/((total catalytic metal)+(alkyl aluminum co-catalyst)+(aluminum alkyl))≤2.0; where the catalytic metal is the total moles of (metal A+metal B+optional metal C). The upper limit on the catalyst deactivator molar ratio may be about 2, in some cases about 1.5 and in other cases about 0.75. The lower limit on the catalyst deactivator molar ratio may be about 0.3, in some cases about 0.35 and in still other cases about 0.4. In general, the catalyst deactivator is added in a minimal amount such that the catalyst is deactivated and the polymerization reaction is quenched.

Solution Passivation

Referring to the embodiments shown in FIGS. 1 and 2; prior to entering the first V/L separator, a passivator or acid scavenger is added to deactivated solution A or B to form a passivated solution, i.e. passivated solution stream 23. Passivator tank 22 may contain neat (100%) passivator, a solution of passivator in a solvent, or a slurry of passivator in a solvent. Non-limiting examples of suitable solvents include linear or branched $C_5$ to $C_{12}$ alkanes. In this disclosure, how the passivator is added is not particularly important. Suitable passivators are well known in the art, non-limiting examples include alkali or alkaline earth metal salts of carboxylic acids or hydrotalcites. The quantity of passivator added can vary over a wide range. In this disclosure the quantity of passivator added was determined by the total moles of chloride compounds added to the solution process, i.e. the chloride compound "compound (vi)" plus the metal compound "compound (vii)". Optionally, a first and second chloride compound and a first and second metal compound may be used, i.e. to form the first and second heterogeneous catalyst formulations; in this case the amount of passivator added is determined by the total moles of all chloride containing compounds. The upper limit on the (passivator)/(total chlorides) molar ratio may be 15, in some cases 13 and in other cases 11. The lower limit on the (passivator)/(total chlorides) molar ratio may be about 5, in some cases about 7 and in still other cases about 9. In general, the passivator is added in the minimal amount to substantially passivate the deactivated solution.

Flexible Manufactured Articles

The ethylene interpolymer products disclosed herein may be converted into flexible manufactured articles such as monolayer or multilayer films, such films are well known to those experienced in the art; non-limiting examples of processes to prepare such films include blown film and cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the drawdown rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however the various thermoplastic materials are metered into a flat die and extruded into a monolayer or multilayer sheet, rather than a tube. In the cast film process the extruded sheet is solidified on a chill roll.

Depending on the end-use application, the disclosed ethylene interpolymer products may be converted into films that span a wide range of thicknesses. Non-limiting examples include, food packaging films where thicknesses may range from about 0.5 mil (13 μm) to about 4 mil (102 μm), and; in heavy duty sack applications film thickness may range from about 2 mil (51 μm) to about 10 mil (254 μm).

The ethylene interpolymer products disclosed herein may be used in monolayer films; where the monolayer may contain more than one ethylene interpolymer products and/or additional thermoplastics; non-limiting examples of thermoplastics include ethylene polymers and propylene polymers. The lower limit on the weight percent of the ethylene interpolymer product in a monolayer film may be about 3 wt %, in other cases about 10 wt % and in still other cases about 30 wt %. The upper limit on the weight percent of the ethylene interpolymer product in the monolayer film may be 100 wt %, in other cases about 90 wt % and in still other cases about 70 wt %.

The ethylene interpolymer products disclosed herein may also be used in one or more layers of a multilayer film; non-limiting examples of multilayer films include three, five, seven, nine, eleven or more layers. The thickness of a specific layer (containing an ethylene interpolymer product) within a multilayer film may be about 5%, in other cases about 15% and in still other cases about 30% of the total multilayer film thickness. In other embodiments, the thickness of a specific layer (containing the ethylene interpolymer product) within a multilayer film may be about 95%, in other cases about 80% and in still other cases about 65% of the total multilayer film thickness. Each individual layer of a multilayer film may contain more than one ethylene interpolymer product and/or additional thermoplastics.

Additional embodiments include laminations and coatings, wherein mono or multilayer films containing the disclosed ethylene interpolymer products are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of an ethylene interpolymer product containing web to a polyester or polyamide web. Prior to lamination, the web containing the disclosed ethylene interpolymer product(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include; polyamide, polyester and polypropylene, or webs containing barrier resin layers such as EVOH. Such webs may also contain a vapor deposited barrier layer; for example a thin silicon oxide ($SiO_x$) or aluminum oxide ($AlO_x$) layer. Multilayer webs (or films) may contain three, five, seven, nine, eleven or more layers.

The ethylene interpolymer products disclosed herein can be used in a wide range of manufactured articles comprising one or more films (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles comprising one or more films containing at least one ethylene interpolymer product include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed ethylene interpolymer products.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat sealing properties are desired in high speed vertical and horizontal form-fill-seal processes that load and seal a commercial product (liquid, solid, paste, part, etc.) inside a pouch-like package.

In addition to desired film physical properties, it is desired that the disclosed ethylene interpolymer products are easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

Embodiments of the present disclosure provide ethylene interpolymer products that have improved film processability. As shown in Table 8, the blown film extruder pressure when processing Examples 2 and 5 was 3920 psi and 3725 psi, respectively; in contrast, the blown film extruder pressure of Comparative Examples B and C were 4205 psi and 4070 psi, respectively. Thus, in blown film processes, Examples 2 and 5 have improved processability relative to Comparative Examples B and C. Improved processability is highly desirable to the film converter because improved processability means higher production rates, e.g. an increase in the pounds of film produced per hour, or feet (meters) of film produced per hour.

Further embodiments of the present disclosure provide films with improved optical properties, e.g. 45° gloss and haze. As shown in Table 9A, the 45° gloss of the Examples were improved (higher) relative to the Comparative Examples, i.e.: Example 2, 45° gloss 80.0; Example 5, 45° gloss 82.2; Comparative Example A, 45° gloss 66.5; Comparative Example B, 45° gloss 66.5, and; Comparative Example C, 45° gloss 74.8. As shown in Table 9A, the percent haze of the Examples were improved (lower) relative to the Comparative Examples, i.e.: Example 2, 4.4% haze; Example 5, 3.5% haze; Comparative Example A, 10.8% haze; Comparative Example B, 8.7% haze, and; Comparative Example C, 4.6% haze. Thus, the films produced from Example 2 and 5 can be advantageously used in any film application where improved film optics (45° gloss and haze) are desired; non-limiting examples of such applications include, food packaging films, stand-up pouches, shrink films, stretch films, in-store packaging, multilayer films and laminates and the like.

Additional embodiments of the present disclosure provide films with improved dart impact. As shown in Table 9A, the blown film dart impact of the Examples were improved (higher) relative to the Comparative Examples, i.e.: Example 2, 569 dart impact; Example 5, 746 dart impact; Comparative Example A, 478 dart impact; Comparative Example B, 478 dart impact, and; Comparative Example C, 556 dart impact. Thus, films produced from Example 2 and 5 can be advantageously used in any application where improved dart impact is desired; non-limiting examples of such applications include, toughness layers in multilayer films or laminates, heavy-duty sacks, trash bags, geomembrane liners, food packaging films, shrink films and stretch films.

Other embodiments of the present disclosure provide films with improved Elmendorf tear properties in the machine direction (MD) and/or the transverse direction (TD). As shown in Table 9A, the tear properties of the Examples were improved (higher) relative to the Comparative Examples. The MD tear values were: Example 2, 300 g; Example 5, 291 g; Comparative Example B, 261 g, and; Comparative Example C, 288 g. The TD tear values were: Example 2, 541 g; Example 5, 524 g; Comparative Example B, 477 g, and; Comparative Example C, 470 g. Thus, the higher machine direction tear and/or transverse direction tear of films produced from Example 2 and 5 can be advantageously used in any blown film application where Elmendorf tear is valued. Non-limiting examples of such applications include: tear resistant layers in multilayer films or laminates; food packaging films and stand-up pouches; shrink films; heavy-duty sacks; overwrap films; industrial and institutional films; trash bags; magazine overwrap and mail bags; construction films; agricultural films, mulch and green house films, and; grocery bags.

Further embodiments of the present disclosure provide films with improved modulus in the machine direction (MD) and/or transverse direction (TD). As shown in Table 9B, the 2% secant modulus of Example 2 is improved (higher) relative to Comparative Examples. Specifically, the MD 2% secant moduli were: Example 2, 147 MPa; Comparative Example A, 120 MPa; Comparative Example B, 127 MPa, and; Comparative Example C, 133 MPa. The TD 2% secant moduli were: Example 2, 150 MPa; Comparative Example A, 125 MPa; Comparative Example B, 141 MPa, and; Comparative Example C, 132 MPa. Thus, higher modulus (1% or 2% secant modulus in the machine direction and/or transverse directions) films produced from Example 2 can be advantageously used in any blown film application where higher modulus films are desired. Higher modulus films are desired in most of the film applications recited above. Using a higher film modulus film the converter can reduce the total (final) thickness of a manufactured article; in contrast with the use of a lower modulus film. In other words, higher modulus films allow the converter to down-gauge films; thus reducing the cost of the manufactured article as well as reducing the environmental impact, i.e. the quantity of material in waste or recycle streams.

Other embodiments of the present disclosure provide films with improved puncture-propagation tear resistance. As shown in Table 9A, the puncture-propagation tear resistance of Example 2 is improved (higher) relative to Comparative Example B. Specifically, the machine direction puncture-propagation tear resistance values were: Example 2, 19.4 N, and; Comparative Example B, 18.6 N. The transverse direction puncture-propagation values were: Example 2, 22.0 N, and; Comparative Example B, 20.8 N. Thus, the higher puncture-propagation tear resistance of films produced from Example 2 can be advantageously used in any blown film application where this physical attribute is desired. Non-limiting examples of such applications include: food packaging films and stand-up pouches; tear resistant layers in multilayer films; monolayer and multilayer barrier films; institutional and consumer trash bags; monolayer and multilayer shrink films; monolayer and multilayer heavy-duty sacks; construction films, and; agricultural films.

Some embodiments of the present disclosure provide films with improvements in at least two or more of the following properties: processability, 45° gloss, haze, dart impact, machine direction tear, cross direction tear, machine direction modulus (1% and/or 2%), transverse direction modulus (1% and/or 2%), machine direction puncture-propagation tear resistance and transverse direction puncture-propagation tear resistance; relative to films formed from comparative ethylene interpolymers.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

Rigid Manufactured Articles

The ethylene interpolymer products disclosed herein may be used to produce rigid manufactured articles, non-limiting examples include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g. natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging, and; truck bed liners, pallets and automotive dunnage. The rigid manufactured articles summarized in this paragraph contain one or more of the ethylene interpolymer products disclosed herein or a blend of at least one of the ethylene interpolymer products disclosed herein with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; deflection temperature under load; VICAT softening point; IZOD impact strength; ARM impact resistance; Charpy impact resistance, and; color (whiteness and/or yellowness index).

A further objective of the present disclosure is to provide rigid manufactured articles comprising the ethylene interpolymer products disclosed herein that have improvements in at least one desirable physical property; relative to rigid manufactured articles formed from comparative ethylene interpolymers.

The rigid manufactured articles described in this section may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Ethylene interpolymer product densities were determined using ASTM D792-13 (Nov. 1, 2013).

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

a.

b. $S.Ex. = \log(I_6/I_2)/\log(6480/2160)$ wherein $I_6$ and $I_2$ are the melt flow rates measured at 190° C. using 6.48 kg and 2.16 kg loads, respectively.

Ethylene interpolymer product molecular weights, $M_n$, $M_w$ and $M_z$, as well the as the polydispersity ($M_w/M_n$), were determined using ASTM D6474-12 (Dec. 15, 2012). This method illuminates the molecular weight distributions of ethylene interpolymer products by high temperature gel permeation chromatography (GPC). The method uses commercially available polystyrene standards to calibrate the GPC.

The "Composition Distribution Branching Index" or "CDBI" of the disclosed Examples and Comparative Examples were determined using a crystal-TREF unit commercially available form Polymer ChAR (Valencia, Spain). The acronym "TREF" refers to Temperature Rising Elution Fractionation. A sample of ethylene interpolymer product (80 to 100 mg) was placed in the reactor of the Polymer ChAR crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer ChAR TREF column filled with stainless steel beads and the column was equilibrated for 45 minutes at 110° C. The ethylene interpolymer product was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized ethylene interpolymer product was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer ChAR software a TREF distribution curve was generated as the ethylene interpolymer product was eluted from the TREF column, i.e. a TREF distribution curve is a plot of the quantity (or intensity) of ethylene interpolymer eluting from the column as a function of TREF elution temperature. A $CDBI_{50}$ was calculated from the TREF distribution curve for each ethylene interpolymer product analyzed. The "$CDBI_{50}$" is defined as the percent of ethylene interpolymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the ethylene interpolymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference.

Neutron Activation Analysis, hereafter N.A.A., was used to determine catalyst residues in ethylene interpolymers and was performed as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5 \times 10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample was calculated from the gamma-ray spectrum and recorded in parts per million relative to the total weight of the ethylene interpolymer sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Film dart impact strength was determined using ASTM D1709-09 Method A (May 1, 2009). In this disclosure the dart impact test employed a 1.5 inch (38 mm) diameter hemispherical headed dart.

Film "puncture", the energy (J/mm) required to break the film was determined using ASTM D5748-95 (originally adopted in 1995, reapproved in 2012).

The "lubricated puncture" test was performed as follows: the energy (J/mm) to puncture a film sample was determined using a 0.75-inch (1.9-cm) diameter pear-shaped fluorocarbon coated probe travelling at 10-inch per minute (25.4-cm/minute). ASTM conditions were employed. Prior to testing the specimens, the probe head was manually lubricated with Muko Lubricating Jelly to reduce friction. Muko Lubricating Jelly is a water-soluble personal lubricant available from Cardinal Health Inc., 1000 Tesma Way, Vaughan, ON L4K 5R8 Canada. The probe was mounted in an Instron Model 5 SL Universal Testing Machine and a 1000-N load cell as used. Film samples (1.0 mil (25 μm) thick, 5.5 inch (14 cm) wide and 6 inch (15 cm) long) were mounted in the Instron and punctured.

The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft·lb/in$^3$). Tensile properties were measured in the both the machine direction (MD) and the transverse direction (TD) of the blown films.

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film tear performance was determined by ASTM D1922-09 (May 1, 2009); an equivalent term for tear is "Elmendorf tear". Film tear was measured in both the machine direction (MD) and the transverse direction (TD) of the blown films.

Film optical properties were measured as follows: Haze, ASTM D1003-13 (Nov. 15, 2013), and; Gloss ASTM D2457-13 (Apr. 1, 2013).

Instrumented impact testing was carried out on a machine called a Dynatup Impact Tester purchased from Illinois Test Works Inc., Santa Barbara, Calif., USA; those skilled in the art frequently call this test the Dynatup impact test. Testing was completed according to the following procedure. Test samples are prepared by cutting about 5 inch (12.7 cm) wide and about 6 inch (15.2 cm) long strips from a roll of blown film; film was about 1 mil thick. Prior to testing, the thickness of each sample was accurately measured with a handheld micrometer and recorded. ASTM conditions were employed. Test samples were mounted in the 9250 Dynatup Impact drop tower/test machine using the pneumatic clamp. Dynatup tup #1, 0.5 inch (1.3 cm) diameter, was attached to the crosshead using the Allen bolt supplied. Prior to testing, the crosshead is raised to a height such that the film impact velocity is 10.9±0.1 ft/s. A weight was added to the crosshead such that: 1) the crosshead slowdown, or tup slowdown, was no more than 20% from the beginning of the test to the point of peak load and 2) the tup must penetrate through the specimen. If the tup does not penetrate through the film, additional weight is added to the crosshead to increase the striking velocity. During each test the Dynatup Impulse Data Acquisition System Software collected the experimental data (load (lb) versus time). At least 5 film samples are tested and the software reports the following average values: "Dynatup Maximum (Max) Load (lb)", the highest load measured during the impact test; "Dynatup Total Energy (ft·lb)", the area under the load curve from the start of the test to the end of the test (puncture of the sample), and; "Dynatup Total Energy at Max Load (ft·lb)", the area under the load curve from the start of the test to the maximum load point.

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together (the two film samples were cut from the same roll of 2.0 mil (51-μm) thick film), i.e. when the polyolefin macromolecules that comprise the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/mm$^2$; delay time, 0.5 second; film peel speed, 7.9 in/second (200 mm/second); testing temperature range, 203° F. to 293° F. (95° C. to 145° C.); temperature increments, 9° F. (5° C.); and five film samples were tested at each temperature increment to calculate average values at each temperature. The following data was recorded for the disclosed Example films and Comparative Example films: the "Tack Onset @ 1.0 N (° C.)", the temperature at which a hot tack force of 1N was observed (average of 5-film samples); "Max Hot tack Strength (N)", the maximum hot tack force observed (average of 5-film samples) over the testing temperature range, and; "Temperature-Max. Hot tack (° C.)", the temperature at which the maximum hot tack force was observed.

In this disclosure, the "Heat Seal Strength Test" was performed as follows. ASTM conditions were employed. Heat seal data was generated using a conventional Instron Tensile Tester. In this test, two film samples are sealed over a range of temperatures (the two film samples were cut from the same roll of 2.0 mil (51-μm) thick film). The following parameters were used in the Heat Seal Strength Test: film specimen width, 1 inch (25.4 mm); film sealing time, 0.5 second; film sealing pressure, 40 psi (0.28 N/mm$^2$); temperature range, 212° F. to 302° F. (100° C. to 150° C.) and temperature increment, 9° F. (5° C.). After aging for at least 24 hours at ASTM conditions, seal strength was determined using the following tensile parameters: pull (crosshead) speed, 12 inch/min (2.54 cm/min); direction of pull, 90° to seal, and; 5 samples of film were tested at each temperature increment. The Seal Initiation Temperature, hereafter S.I.T., is defined as the temperature required to form a commercially viable seal; a commercially viable seal has a seal strength of 2.0 lb per inch of seal (8.8 N per 25.4 mm of seal).

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 μm) monolayer film was placed in a stainless steel basket, the film and basket were weighed ($w^i$), while in the basket the film was: extracted with n-hexane at 49.5° C. for two hours; dried at 80° C. in a vacuum oven for 2 hours; cooled in a desiccator for 30 minutes, and; weighed ($w^f$). The percent loss in weight is the percent hexane extractables ($w^{C6}$): $w^{C6}=100\times(w^i-w^f)/w^i$.

EXAMPLES

Polymerization

The following examples are presented for the purpose of illustrating selected embodiments of this disclosure; it being understood, that the examples presented do not limit the claims presented.

Disclosed embodiments of the ethylene interpolymer products were prepared in a pilot plant using the series mode embodiment of the continuous solution polymerization process shown in FIG. 1. Comparative ethylene interpolymer products were prepared in a pilot plant using the comparative continuous solution process shown in FIG. 3, Process A. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 0.58 gallons (2.2 L) or 4.8 gallons (18 L). The Examples and Comparative Examples of ethylene interpolymer products shown in the Tables 1A-1C, 2A-2C, 3A-3C and 4A-4C were produced using an R1 pressure from about 14 MPa to about 18 MPa; R2 was operated at a lower pressure to facilitate continuous flow from R1 to R2. R1 and R2 were operated in series mode, wherein the first exit stream from R1 flows directly into R2. Both CSTR's were agitated to give conditions in which the reactor contents were well mixed. The process was operated continuously by feeding fresh process solvent, ethylene, 1-octene and hydrogen to the reactors.

The single site catalyst components used were: component (i), cyclopentadienyl tri(tertiary butyl)phosphinimine titanium dichloride, (Cp[(t-Bu)$_3$PN]TiCl$_2$) (abbreviated PIC-1 in Tables 1A, 2A and 3A), or cyclopentadienyl tri(isopropyl)phosphinimine titanium dichloride, (Cp[(isopropyl)$_3$PN]TiCl$_2$) (abbreviated PIC-2 in Table 4A); component (ii), methylaluminoxane (MAO-07); component (iii), trityl tetrakis(pentafluoro-phenyl)borate, and; component (iv), 2,6-di-tert-butyl-4-ethylphenol. The single site catalyst component solvents used were methylpentane for components (ii) and (iv) and xylene for components (i) and (iii). The quantity of PIC-1, or PIC-2, added to the respective reactor "R1 (i) (ppm)" or "R2 (i) (ppm)" is shown in Tables 1A, 2A and 3A; to be clear, in Comparative Example 1 in Table 1A, the solution in R1 and R2 contained 0.11 ppm and 0.27 ppm of PIC-1, respectively. The mole ratios of the single site catalyst components in the respective reactor are also shown in Tables 1A, 2A, 3A and 4A; specifically: (ii)/(i) [(MAO-07)/(PIC-1)]; (iv)/(ii) [(2,6-di-tert-butyl-4-ethylphenol)/(MAO-07)], and; (iii)/(i) [(trityl tetrakis(pentafluoro-phenyl)borate)/(PIC-1)]. To be clear, in Comparative Example 1 (Table 1A), the mole ratios in R1 were: R1 (ii)/(i)=100; R1 (iv)/(ii)=0.3, and; R1 (iii)/(i)=1.2. In Comparative Example 1, the mole ratios in R2 were: R2 (ii)/(i) =25; R2 (iv)/(ii)=0.3, and; R2 (iii)/(i)=1.27.

The in-line Ziegler-Natta catalyst formulation was prepared from the following components: component (v), butyl ethyl magnesium; component (vi), tertiary butyl chloride; component (vii), titanium tetrachloride; component (viii), diethyl aluminum ethoxide, and; component (ix), triethyl aluminum. Methylpentane was used as the catalyst component solvent. For Examples 1 through 5 shown in Table 1A, Examples 6 through 8 shown in Table 2A, Example 9 through 11 shown in Table 3A and Example 12 shown in Table 4A, the in-line Ziegler-Natta catalyst formulation was prepared using the following steps. In step one, a solution of triethylaluminum and dibutylmagnesium ((triethylaluminum)/(dibutylmagnesium) molar ratio of 20) was combined with a solution of tertiary butyl chloride and allowed to react for about 30 seconds (HUT-1); in step two, a solution of titanium tetrachloride was added to the mixture formed in step one and allowed to react for about 14 seconds (HUT-2), and; in step three, the mixture formed in step two was allowed to reactor for an additional 3 seconds (HUT-3) prior to injection into R2. The in-line Ziegler-Natta catalyst formulation was formed in R2 by injecting a solution of diethyl aluminum ethoxide into R2. The quantity of titanium tetrachloride "R2 (vii) (ppm)" added to reactor 2 (R2) is shown in Table 1A; to be clear in Example 1 the solution in R2 contained 4.0 ppm of TiCl$_4$. The mole ratios of the in-line Ziegler-Natta catalyst components are also shown in Table 1A, specifically: (vi)/(v) or (tertiary butyl chloride)/(butyl ethyl magnesium); (viii)/(vii) or (diethyl aluminum ethoxide)/(titanium tetrachloride), and; (ix)/(vii) or (triethyl aluminum)/(titanium tetrachloride). To be clear, in Example 1, the following mole ratios were used to synthesize the in-line Ziegler-Natta catalyst: R2 (vi)/(v)=2.04; R2 (viii)/(vii) =1.35, and; R2 (ix)/(vii)=0.35. Referring to FIG. 1, in all of the Examples disclosed, 100% of the diethyl aluminum ethoxide in stream 10d, component (viii), was added to reactor 12a via stream 10h.

Average residence time of the solvent in a reactor is primarily influenced by the amount of solvent flowing through each reactor and the total amount of solvent flowing through the solution process, the following are representative or typical values for the examples shown in Tables 1A through 4C: average reactor residence times were: about 61 seconds in R1, about 73 seconds in R2, about 7.3 seconds for an R3 volume of 0.58 gallons (2.2 L), and 50 seconds for an R3 volume of 4.8 gallons (18 L).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+moles aluminum); this mole ratio was consistently used in all examples (Examples and Comparative Examples).

A two-stage devolitizing process was employed to recover the ethylene interpolymer product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was 10-fold higher than the molar amount of tertiary butyl chloride and titanium tetrachloride added to the solution process.

Prior to pelletization the ethylene interpolymer product was stabilized by adding 500 ppm of Irganox 1076 (a primary antioxidant) and 500 ppm of Irgafos 168 (a secondary antioxidant), based on weight of the ethylene interpolymer product. Antioxidants were dissolved in process solvent and added between the first and second V/L separators.

In the case of Examples 1-5 and Comparative Examples 1 and 2, Tables 1B and 1C discloses additional process parameters, e.g. ethylene and 1-octene splits between the reactors, and reactor temperatures and ethylene conversions, etc. In Tables 1A-1C the targeted ethylene interpolymer product was 1.0 melt index (I$_2$) (ASTM D1239, 2.16 kg load, 190° C.) and 0.917 g/cm$^3$ (ASTM D792). In Tables 1A-1C, Comparative Example 1 should be compared with Example 1. In Comparative Example 1, the single site catalyst formulation was injected into both reactor R1 and reactor R2, ES$^{R1}$ was 40%, ES$^{R2}$ was 60% and the volume of reactor R3 was 0.58 gallons (2.2 L); 10% of R2's volume. In Example 2, the single site catalyst formulation was injected into R1, the in-line Ziegler-Natta catalyst formulation was injected into R2, ES$^{R1}$ was 40%, ES$^{R2}$ was 60% and the volume of R3 was 0.58 gallons (2.2 L). Relative to Comparative Example 1, the production rate of Example 1 was increased by 8.8%.

In Table 1A-1C, Comparative Example 2 should be compared with Example 2. In Comparative Example 2, the single site catalyst formulation was injected into both R1 and R2, ES$^{R1}$ was 40%, ES$^{R2}$ was 60% and the volume of R3 was 4.8 gallons (18.0 L); 82% of R2's volume. In Example 2, the single site catalyst formulation was injected into R1, the in-line Ziegler-Natta catalyst formulation was injected into R2, ES$^{R1}$ was 40%, ES$^{R2}$ was 60% and the volume of R3 was 4.8 gallons (18.0 L). Comparing Examples 2, 3 and 4, the ethylene splits to R1 (ES$^{R1}$) were 40%, 44% and 47%, respectively; the production rates were 17.6%, 22.7% and 27.5% higher, respectively, relative to Comparative Example 2.

As shown in Tables 1A-1C, the production rates of Comparative Examples 1 and 2 are essentially the same, 81.1 kg/hr and 80.6 kg/hr, respectively; regardless of the volume of R3, i.e. 0.58 gallons (2.2 L) and 4.8 gallons (18 L), respectively.

In Example 5, ethylene was injected into R3 (the tubular reactor); specifically, $ES^{R1}$ was 40%, $ES^{R2}$ was 50% and $ES^{R3}$ was 10%. In Example 5 the single site catalyst formulation was injected into R1, the in-line Ziegler-Natta catalyst formulation was injected into R2 and the volume of R3 was 4.8 gallons (18.0 L). Relative to Comparative Example 2, the production rate of Example 5 increased by 17.4%.

Tables 2A-2C disclose continuous solution process parameters recorded during the production of: (a) an ethylene interpolymer product with a target melt index of 0.65 dg/min and a target density of 0.916 g/cm³ (Examples 6 and 7; and Comparative Example 3) and; (b) an ethylene interpolymer product with a target melt index of 4.0 dg/min and a density of 0.917 g/cm³ (Example 8 and Comparative Example 4). Relative to Comparative Example 3, Examples 6 and 7 have increased production rates of 12.7 and 24.3%, respectively. In Comparative Example 3, the single site catalyst formulation was injected into both reactor R1 and R2, $ES^{R1}$ was 50%, $ES^{R2}$ was 50% and the volume of reactor R3 was 0.58 gallons (2.2 L). In Examples 6 and 7 the single site catalyst formulation was injected into R1 and the in-line Ziegler-Natta catalyst formulation was injected into R2 and the volume of R3 was 4.8 gallons (18 L). Examples 6 and 7 differ in ethylene split, i.e. $ES^{R1}$ was 40% and 47%, respectively. Relative to Comparative Example 4, Example 8 has an increased production rate of 22.4%. In Comparative Example 4, the single site catalyst formulation was injected into both reactor R1 and R2, $ES^{R1}$ was 45% and the volume of reactor R3 was 0.58 gallons (2.2 L). In Example 8 the single site catalyst formulation was injected into R1, the in-line Ziegler-Natta catalyst formulation was injected into R2, $ES^{R1}$ was 40% and the volume of R3 was 4.8 gallons (18 L).

Tables 3A-3C disclose continuous solution process parameters recorded during the production of: (a) an ethylene interpolymer product with a target melt index of 0.85 dg/min and a target density of 0.919 g/cm³ (Example 9 and Comparative Example 5); (b) an ethylene interpolymer product with a target melt index of 0.85 dg/min and a target density of about 0.924 g/cm³ (Example 10 and Comparative Example 6), and; (c) an ethylene interpolymer product with a target melt index of 1.0 dg/min and a target density of 0.912 g/cm³ (Example 11 and Comparative Example 7). Relative to Comparative Example 5, Example 9 has an increased production rate of 29.2%. In Comparative Example 5, the single site catalyst formulation was injected into both reactor R1 and R2, $ES^{R1}$ was 45% and the volume of reactor R3 was 0.58 gallons (2.2 L). In Example 9 the single site catalyst formulation was injected into R1, the in-line Ziegler-Natta catalyst formulation was injected into R2, $ES^{R1}$ was 40% and the volume of R3 was 4.8 gallons (18 L). Relative to Comparative Example 6, Example 10 has an increased production rate of 10.5%. In Comparative Example 6, the single site catalyst formulation was injected into both reactor R1 and R2, $ES^{R1}$ was 45% and the volume of reactor R3 was 0.58 gallons (2.2 L). In Example 10 the single site catalyst formulation was injected into R1, the in-line Ziegler-Natta catalyst formulation was injected into R2, $ES^{R1}$ was 40% and the volume of R3 was 4.8 gallons (18 L). Relative to Comparative Example 7, Example 11 has an increased production rate of 20.9%. In Comparative Example 7, the single site catalyst formulation was injected into both reactor R1 and R2, $ES^{R1}$ was 50% and the volume of reactor R3 was 0.58 gallons (2.2 L). In Example 11 the single site catalyst formulation was injected into R1, the in-line Ziegler-Natta catalyst formulation was injected into R2, $ES^{R1}$ was 40% and the volume of R3 was 4.8 gallons (18 L).

In Tables 4A-4C PIC-2 was employed as single site catalyst component (i) and continuous solution process parameters are disclosed for the production of an ethylene interpolymer product with a target melt index of 1.0 and a target density of 0.917 g/cm³. As shown in Table 4A, relative to Comparative Example 8, Example 12 has an increased production rate of 12.0%. In Comparative Example 8, the single site catalyst formulation was injected into both reactor R1 and R2, $ES^{R1}$ was 50% and the volume of reactor R3 was 0.58 gallons (2.2 L). In Example 12 the single site catalyst formulation was injected into R1, the in-line Ziegler-Natta catalyst formulation was injected into R2, $ES^{R1}$ was 40% and the volume of R3 was 4.8 gallons (18 L).

Given the continuous solution polymerization conditions provided in Table 1A through 4C, the resulting ethylene interpolymer products produced are summarized in Table 5. Table 5 also includes the following commercially available products: Comparative Examples A and D are commercially available solution process ethylene/1-octene polymers produced by NOVA Chemicals Company (Calgary, Alberta, Canada) SURpASS® FPs117-C and SURpASS® FPs317-A, respectively; Comparative Examples B and C are commercially available solution process ethylene/1-octene copolymers produced by The Dow Chemical Company (Midland, Mich., USA), Elite® 5401G and Elite® 5400G, respectively.

As shown in Table 6, Neutron Activation Analysis results disclose catalyst residues in Examples 2, 5 and 8 and Comparative Example D. Comparative Example D (SURpASS® FPs117-C) was produced according to the Process A shown in FIG. 3 using a single-site catalyst formulation in both R1 and R2.

Table 7A summarizes computer generated Simulated Example 13, based on the configuration of the solution pilot plant described above, using an R3 (tubular reactor) volume of 4.8 gallons (18 L). In Simulated Example 13 a single-site catalyst formulation (PIC-1) was used in R1 and an in-line Ziegler-Natta catalyst formulation was used in R2. Table 7A discloses a non-limiting example of the density, melt index and molecular weights of the first, second and third ethylene interpolymers produced in the three reactors (R1, R2 and R3); these three interpolymers are combined to produce Simulated Example 13 (the ethylene polymer product). To be clear, Simulated Example 13 has a density of 0.9169 g/cm³, a melt index of 1.0 dg/min, a branch frequency of 12.1 (the number of $C_6$-branches per 1000 carbon atoms (1-octene comonomer)) and a $M_w/M_n$ of 3.11. The simulated production rate of Simulated Example 13 was 90.9 kg/hr and the R3 exit temperature was 217.1° C.

Table 7B summarizes computer generated Simulated Comparative Example 9, based on the configuration of the solution pilot plant described above, using an R3 (tubular reactor) volume of 4.8 gallons (18 L). In Simulated Comparative Example 9 a single-site catalyst formulation (PIC-1) was used in both R1 and R2. Table 7B discloses an example of the density, melt index and molecular weights of the first, second and third ethylene interpolymers produced in the three reactors (R1, R2 and R3) which are combined to form Simulated Comparative Example 9. The production rate of Simulated Comparative Example 9 was 82.6 kg/hr and the R3 exit temperature was 200.2° C.

Computer simulations were consistent with the results shown in Tables 1A through 4C, i.e. the production rate of Simulated Example 13 was 9.6% higher relative to Simulated Comparative Example 9.

Film Production

Monolayer blown films were produced on a Gloucester extruder, 2.5 inch (6.45 cm) barrel diameter, 24/1 L/D (barrel Length/barrel Diameter) equipped with: a barrier screw; a low pressure 4 inch (10.16 cm) diameter die with a 35 mil (0.089 cm) die gap, and; a Western Polymer Air ring. Blown films, 1.0 mil (25 μm) thick, were produced at a constant output rate of 100 lb/hr (45.4 kg/hr) by adjusting extruder screw speed, and; the frost line height was maintained at about 16 inch (40.64 cm) by adjusting the cooling air. Blown film processing conditions for Comparative Examples A, B and C and Examples 2 and 5 are disclosed in Table 8. Monolayer blown film was also produced at 2.0 mil (51 μm) and 3.5 mil (89 μm) for specific tests. Processing aid was added to Example 2 and 5 prior to film extrusion; the processing aid added was Dynamar FX 5920A (commercially available from The 3M Company, St. Paul, Minn., USA).

As shown in Table 8, in blown film processes, Examples 2 and 5 have improved processability relative to Comparative Examples B and C, i.e. lower extrusion pressures. Improved processability is highly desirable to the film converter because improved processability means higher production rates, e.g. an increase in the pounds of film produced per hour, or feet (meters) of film produced per hour.

Tables 9A and 9B disclose physical properties of blown films produced from Example 2 and Example 5, which can be compared with three Comparative Examples A, B and C.

As shown in Table 9A, relative to Comparative Examples A, B and C, blown films produced from Examples 2 and 5 can be advantageously used in any film application where improved film optics are desired, i.e. improved film 45° gloss and/or film haze.

As shown in Table 9A, relative to Comparative Examples A, B and C, blown films produced from Examples 2 and 5 can be advantageously used in any film application where improved film dart impact is valued.

As shown in Table 9A, relative to Comparative Examples B and C, blown films produced from Examples 2 and 5 can be advantageously used in any film application where improved Elmendorf tear is desired, i.e. improved machine direction Elmendorf tear and/or improved transverse direction Elmendorf tear.

As shown in Table 9B, relative to Comparative Examples A, B and C, blown films produced from Example 2 can be advantageously used in any film application where improved film modulus is valued, i.e. higher 1% secant modulus and/or higher 2% secant modulus in the machine direction and/or transverse direction.

As shown in Table 9A, relative to Comparative Examples B, blown films produced from Example 2 can be advantageously used in any film application where improved puncture-propagation tear resistance is desired.

TABLE 1A

Continuous solution process catalyst parameters for Examples 1-5 and Comparative Examples 1-2; targeting ethylene interpolymer products at 1.0 $I_2$ and 0.917 g/cm³.

| Process Parameter | Example 1 | Example 2 | Example 3 | Example 4 | Example 5 | Comparative Example 1 | Comparative Example 2 |
|---|---|---|---|---|---|---|---|
| R1 Catalyst | PIC-1 | PIC-1 | PIC-1 | PIC-1 | PIC-1 | PIC-1 | PIC-1 |
| R2 Catalyst | ZN | ZN | ZN | ZN | ZN | PIC-1 | PIC-1 |
| R1 (i) (ppm) | 0.1 | 0.12 | 0.12 | 0.12 | 0.09 | 0.11 | 0.1 |
| R1 (ii)/(i) mole ratio | 100 | 100 | 100 | 100 | 100 | 100 | 100 |
| R1 (iv)/(ii) mole ratio | 0 | 0 | 0 | 0 | 0 | 0.3 | 0.3 |
| R1 (iii)/(i) mole ratio | 1.1 | 1.1 | 1.1 | 1.1 | 1.2 | 1.2 | 1.2 |
| R2 (i) (ppm) | 0 | 0 | 0 | 0 | 0 | 0.27 | 0.22 |
| R2 (ii)/(i) mole ratio | 0 | 0 | 0 | 0 | 0 | 25 | 25 |
| R2 (iv)/(ii) mole ratio | 0 | 0 | 0 | 0 | 0 | 0.3 | 0.3 |
| R2 (iii)/(i) mole ratio | 0 | 0 | 0 | 0 | 0 | 1.27 | 1.27 |
| R2 (vii) (ppm) | 4.0 | 4.2 | 5.1 | 6.5 | 4.5 | 0 | 0 |
| R2 (vi)/(v) mole ratio | 2.04 | 2.07 | 2.05 | 2.03 | 1.97 | 0 | 0 |
| R2 (viii)/(vii) mole ratio | 1.35 | 1.35 | 1.35 | 1.35 | 1.35 | 0 | 0 |
| R2 (ix)/(vii) mole ratio | 0.35 | 0.35 | 0.35 | 0.35 | 0.35 | 0 | 0 |
| Prod. Rate (kg/h) | 88.2 | 94.8 | 98.9 | 102.8 | 94.6 | 81.1 | 80.6 |
| Increase in Prod. Rate (%) | 8.8 | 17.6 | 22.7 | 27.5 | 17.4 | | |

TABLE 1B

Additional solution process parameters for Examples 1-5 and Comparative Examples 1-2.

| Process Parameter | Example 1 | Example 2 | Example 3 | Example 4 | Example 5 | Comparative Example 1 | Comparative Example 2 |
|---|---|---|---|---|---|---|---|
| R3 volume (L) | 2.2 | 18 | 18 | 18 | 18 | 2.2 | 18 |
| $ES^{R1}$ (%) | 40 | 40 | 44 | 47 | 40 | 50 | 50 |
| $ES^{R2}$ (%) | 60 | 60 | 56 | 53 | 50 | 50 | 50 |
| $ES^{R3}$ (%) | 0 | 0 | 0 | 0 | 10 | 0 | 0 |
| R1 ethylene concentration (wt %) | 10.3 | 10.3 | 10.3 | 10.3 | 10.3 | 9.8 | 9.8 |
| R2 ethylene concentration (wt %) | 15.4 | 15.4 | 16 | 16.4 | 15 | 13.2 | 12.6 |

TABLE 1B-continued

Additional solution process parameters for Examples 1-5 and Comparative Examples 1-2.

| Process Parameter | Example 1 | Example 2 | Example 3 | Example 4 | Example 5 | Comparative Example 1 | Comparative Example 2 |
|---|---|---|---|---|---|---|---|
| R3 ethylene concentration (wt %) | 15.4 | 15.4 | 16 | 16.4 | 15.8 | 13.2 | 12.6 |
| ((1-octene)/(ethylene))$^{R1}$ (wt %) | 0.66 | 0.67 | 0.74 | 0.78 | 0.61 | 0.73 | 0.71 |
| $OS^{R1}$ (%) | 100 | 100 | 100 | 100 | 100 | 100 | 100 |
| $OS^{R2}$ (%) | 0 | 0 | 0 | 0 | 0 | 0 | 0 |
| $OS^{R3}$ (%) | 0 | 0 | 0 | 0 | 0 | 0 | 0 |
| $H_2^{R1}$ (ppm) | 0.2 | 0.2 | 0.2 | 0.2 | 0.2 | 0.5 | 0.4 |
| $H_2^{R2}$ (ppm) | 3.7 | 3.5 | 4 | 16 | 4 | 0.8 | 0.8 |
| $H_2^{R3}$ (ppm) | 0 | 0 | 0 | 0 | 0.5 | 0 | 0 |
| Prod. Rate (kg/h) | 88.2 | 94.8 | 98.9 | 102.8 | 94.6 | 81.1 | 80.6 |
| Increase in Prod. Rate (%) | 8.8 | 17.6 | 22.7 | 27.5 | 17.4 | | |

TABLE 1C

Additional solution process parameters for Examples 1-5 and Comparative Examples 1-2; target product 1.0 $I_2$ and 0.917 g/cm$^3$.

| Process Parameter | Example 1 | Example 2 | Example 3 | Example 4 | Example 5 | Comparative Example 1 | Comparative Example 2 |
|---|---|---|---|---|---|---|---|
| R1 total solution rate (kg/h) | 360.5 | 358.8 | 410.2 | 449 | 369.9 | 404.1 | 385.7 |
| R2 total solution rate (kg/h) | 239.5 | 241.2 | 189.8 | 151 | 199.3 | 195.9 | 214.3 |
| R3 solution rate (kg/h) | 0 | 0 | 0 | 0 | 30.8 | 0 | 0 |
| Total solution rate (kg/h) | 600 | 600 | 600 | 600 | 600 | 600 | 600 |
| R1 inlet temp (° C.) | 30 | 30 | 30 | 30 | 30 | 30 | 30 |
| R2 inlet temp (° C.) | 30 | 30 | 30 | 30 | 30 | 30 | 30 |
| R3 inlet temp (° C.) | 130 | 130 | 130 | 130 | 130 | 130 | 130 |
| R1 Mean temp (° C.) | 141 | 141 | 141 | 141 | 140 | 140 | 140 |
| R2 Mean temp (° C.) | 206 | 206 | 213 | 218 | 203 | 195 | 188 |
| R3 exit temp (actual) (° C.) | 208 | 214 | 219 | 223 | 219 | 195 | 195 |
| R3 exit temp (calc) (° C.) | 207 | 217 | 223 | 229 | 223 | 196 | 193 |
| $Q^{R1}$ (%) | 78.2 | 78.2 | 78.2 | 78.2 | 78.2 | 81.6 | 81.6 |
| $Q^{R2}$ (%) | 80 | 80 | 80 | 80 | 80 | 83.9 | 83.9 |
| $Q^{(R2+R3)}$ (%) | 80.8 | 90 | 88.8 | 89.6 | 86.4 | 86.4 | 92.6 |
| $Q^{R3}$ (%) | 4 | 49.8 | 44 | 48 | 57 | 15.4 | 54 |
| $Q^T$ (%) | 93.4 | 93.1 | 93.1 | 93.4 | 90.7 | 91.9 | 95.6 |
| Prod. Rate (kg/h) | 88.2 | 94.8 | 98.9 | 102.8 | 94.6 | 81.1 | 80.6 |
| Increase in Prod. Rate (%) | 8.8 | 17.6 | 22.7 | 27.5 | 17.4 | | |

TABLE 2A

Continuous solution process catalyst parameters for:
Examples 6 and 7 and Comparative Example 3, targeting
ethylene interpolymer products at 0.65 $I_2$ and 0.916 g/cm$^3$, and;
Example 8 and Comparative Example 4, targeting
ethylene interpolymer products at 4.0 $I_2$ and 0.917 g/cm$^3$.

| Process Parameter | Example 6 | Example 7 | Comparative Example 3 | Example 8 | Comparative Example 4 |
|---|---|---|---|---|---|
| R1 Catalyst | PIC-1 | PIC-1 | PIC-1 | PIC-1 | PIC-1 |
| R2 Catalyst | ZN | ZN | PIC-1 | ZN | PIC-1 |
| R1 (i) (ppm) | 0.09 | 0.1 | 0.07 | 0.11 | 0.25 |
| R1 (ii)/(i) mole ratio | 100 | 100 | 100 | 100 | 100 |
| R1 (iv)/(ii) mole ratio | 0 | 0 | 0.3 | 0 | 0.3 |
| R1 (iii)/(i) mole ratio | 1.1 | 1.1 | 1.2 | 1.1 | 1.1 |
| R2 (i) (ppm) | 0 | 0 | 0.14 | 0 | 0.17 |
| R2 (ii)/(i) mole ratio | 0 | 0 | 25 | 0 | 25 |

TABLE 2A-continued

Continuous solution process catalyst parameters for:
Examples 6 and 7 and Comparative Example 3, targeting
ethylene interpolymer products at 0.65 $I_2$ and 0.916 g/cm$^3$, and;
Example 8 and Comparative Example 4, targeting
ethylene interpolymer products at 4.0 $I_2$ and 0.917 g/cm$^3$.

| Process Parameter | Example 6 | Example 7 | Comparative Example 3 | Example 8 | Comparative Example 4 |
|---|---|---|---|---|---|
| R2 (iv)/(ii) mole ratio | 0 | 0 | 0.3 | 0 | 0.3 |
| R2 (iii)/(i) mole ratio | 0 | 0 | 1.27 | 0 | 1.27 |
| R2 (vii) (ppm) | 3.2 | 4.8 | 0 | 4.8 | 0 |
| R2 (vi)/(v) mole ratio | 1.98 | 1.98 | 0 | 2.03 | 0 |
| R2 (viii)/(vii) mole ratio | 1.35 | 1.35 | 0 | 1.35 | 0 |
| R2 (ix)/(vii) mole ratio | 0.35 | 0.35 | 0 | 0.35 | 0 |
| Prod. Rate (kg/h) | 85.2 | 94 | 75.6 | 99.7 | 81.4 |
| Increase in Prod. Rate (%) | 12.7 | 24.3 | | 22.4 | |

TABLE 2B

Additional solution process parameters for
Examples 6-8 and Comparative Examples 3 and 4.

| Process Parameter | Example 6 | Example 7 | Comparative Example 3 | Example 8 | Comparative Example 4 |
|---|---|---|---|---|---|
| R3 volume (L) | 18 | 18 | 2.2 | 18 | 2.2 |
| $ES^{R1}$ (%) | 40 | 47 | 50 | 40 | 45 |
| $ES^{R2}$ (%) | 60 | 53 | 50 | 60 | 55 |
| $ES^{R3}$ (%) | 0 | 0 | 0 | 0 | 0 |
| R1 ethylene concentration (wt %) | 10.3 | 10.3 | 10.3 | 9.6 | 9.3 |
| R2 ethylene concentration (wt %) | 13.7 | 14.9 | 12.7 | 15.5 | 13.5 |
| R3 ethylene concentration (wt %) | 13.7 | 14.9 | 12.7 | 15.5 | 13.5 |
| ((1-octene)/(ethylene))$^{R1}$ (wt %) | 0.63 | 0.66 | 0.81 | 0.79 | 0.65 |
| $OS^{R1}$ (%) | 100 | 100 | 83.3 | 100 | 100 |
| $OS^{R2}$ (%) | 0 | 0 | 16.7 | 0 | 0 |
| $OS^{R3}$ (%) | 0 | 0 | 0 | 0 | 0 |
| $H_2^{R1}$ (ppm) | 0.2 | 0.2 | 1.3 | 1.5 | 1 |
| $H_2^{R2}$ (ppm) | 1 | 1 | 0.8 | 15 | 1.4 |
| $H_2^{R3}$ (ppm) | 0 | 0 | 0 | 0 | 0 |
| Prod. Rate (kg/h) | 85.2 | 94 | 75.6 | 99.7 | 81.4 |
| Increase in Prod. Rate (%) | 12.7 | 24.3 | | 22.4 | |

TABLE 2C

Additional solution process parameters for
Examples 6-8 and Comparative Examples 3 and 4.

| Process Parameter | Example 6 | Example 7 | Comparative Example 3 | Example 8 | Comparative Example 4 |
|---|---|---|---|---|---|
| R1 total solution rate (kg/h) | 319.9 | 409.1 | 369.9 | 386.6 | 391.9 |
| R2 total solution rate (kg/h) | 280.1 | 190.9 | 230.1 | 213.4 | 208.1 |
| R3 solution rate (kg/h) | 0 | 0 | 0 | 0 | 0 |
| Overall total solution rate (kg/h) | 600 | 600 | 600 | 600 | 600 |
| R1 inlet temp (° C.) | 30 | 30 | 30 | 30 | 30 |
| R2 inlet temp (° C.) | 30 | 30 | 30 | 30 | 30 |
| R3 inlet temp (° C.) | 130 | 130 | 130 | 130 | 130 |
| R1 Mean temp (° C.) | 140.3 | 140.1 | 140.2 | 140.6 | 144.1 |
| R2 Mean temp (° C.) | 187.8 | 202.5 | 185.7 | 208.3 | 194.9 |
| R3 exit temp (actual) (° C.) | 198.4 | 212.1 | 186 | 216.7 | 196 |
| R3 exit temp (calc) (° C.) | 200.4 | 215.3 | 187.6 | 222.2 | 197.1 |
| $Q^{R1}$ (%) | 78.2 | 78.2 | 78.2 | 82.6 | 88.5 |
| $Q^{R2}$ (%) | 80 | 80 | 81 | 80 | 81.2 |
| $Q^{R2+R3}$ (%) | 92 | 92.5 | 83.7 | 92.4 | 84.2 |
| $Q^{R3}$ (%) | 60 | 62.4 | 14.1 | 62.2 | 16.1 |

TABLE 2C-continued

Additional solution process parameters for Examples 6-8 and Comparative Examples 3 and 4.

| Process Parameter | Example 6 | Example 7 | Comparative Example 3 | Example 8 | Comparative Example 4 |
|---|---|---|---|---|---|
| $Q^T$ (%) | 94.5 | 95.2 | 90.1 | 94.9 | 90.5 |
| Prod. Rate (kg/h) | 85.2 | 94 | 75.6 | 99.7 | 81.4 |
| Increase in Prod. Rate (%) | 12.7 | 24.3 | | 22.4 | |

TABLE 3A

Continuous solution process catalyst parameters for: Example 9 and Comparative Example 5, targeting ethylene interpolymer products at 0.85 $I_2$ and 0.919 g/cm³; Example 10 and Comparative Example 6, targeting ethylene interpolymer products at 0.85 $I_2$ and 0.924 g/cm³, and; Example 11 and Comparative Example 7, targeting ethylene interpolymer products at 1.0 $I_2$ and 0.912 g/cm³.

| Process Parameter | Example 9 | Comparative Example 5 | Example 10 | Comparative Example 6 | Example 11 | Comparative Example 7 |
|---|---|---|---|---|---|---|
| R1 Catalyst | PIC-1 | PIC-1 | PIC-1 | PIC-1 | PIC-1 | PIC-1 |
| R2 Catalyst | ZN | PIC-1 | ZN | PIC-1 | ZN | PIC-1 |
| R1 (i) (ppm) | 0.1 | 0.15 | 0.47 | 0.12 | 0.1 | 0.08 |
| R1 (ii)/(i) mole ratio | 100 | 100 | 50 | 100 | 100 | 100 |
| R1 (iv)/(ii) mole ratio | 0 | 0.3 | 0 | 0.3 | 0 | 0.3 |
| R1 (iii)/(i) mole ratio | 1.1 | 1.2 | 1.1 | 1.2 | 1.1 | 1.2 |
| R2 (i) (ppm) | 0 | 0.3 | 0 | 0.08 | 0 | 0.42 |
| R2 (ii)/(i) mole ratio | 0 | 25 | 0 | 25 | 0 | 25 |
| R2 (iv)/(ii) mole ratio | 0 | 0.3 | 0 | 0.3 | 0 | 0.3 |
| R2 (iii)/(i) mole ratio | 0 | 1.27 | 0 | 1.5 | 0 | 1.2 |
| R2 (vii) (ppm) | 4 | 0 | 3.3 | 0 | 4.7 | 0 |
| R2 (vi)/(v) mole ratio | 2.03 | 0 | 1.98 | 0 | 2.03 | 0 |
| R2 (viii)/(vii) mole ratio | 1.35 | 0 | 1.35 | 0 | 1.35 | 0 |
| R2 (ix)/(vii) mole ratio | 0.35 | 0 | 0.35 | 0 | 0.35 | 0 |
| Prod. Rate (kg/h) | 98.2 | 76 | 84 | 76 | 92.3 | 76.3 |
| Increase in Prod. Rate (%) | 29.2 | | 10.5 | | 20.9 | |

TABLE 3B

Additional solution process parameters for Examples 9-11 and Comparative Examples 5-7.

| Process Parameter | Example 9 | Comparative Example 5 | Example 10 | Comparative Example 6 | Example 11 | Comparative Example 7 |
|---|---|---|---|---|---|---|
| R3 volume (L) | 18 | 2.2 | 18 | 2.2 | 18 | 2.2 |
| $ES^{R1}$ (%) | 40 | 45 | 40 | 45 | 40 | 50 |
| $ES^{R2}$ (%) | 60 | 55 | 60 | 55 | 60 | 50 |
| $ES^{R3}$ (%) | 0 | 0 | 0 | 0 | 0 | 0 |
| R1 ethylene concentration (wt %) | 10.2 | 9.9 | 8.1 | 8.4 | 9.2 | 9.9 |
| R2 ethylene concentration (wt %) | 15.7 | 13.1 | 14 | 13.1 | 14.6 | 11.6 |
| R3 ethylene concentration (wt %) | 15.7 | 13.1 | 14 | 13.1 | 14.6 | 11.6 |
| ((1-octene)/(ethylene))$^{R1}$ (wt %) | 0.68 | 0.51 | 0.29 | 0.32 | 0.77 | 0.96 |
| $OS^{R1}$ (%) | 100 | 100 | 100 | 100 | 100 | 100 |
| $OS^{R2}$ (%) | 0 | 0 | 0 | 0 | 0 | 0 |
| $OS^{R3}$ (%) | 0 | 0 | 0 | 0 | 0 | 0 |
| $H_2^{R1}$ (ppm) | 0.2 | 0.8 | 0.2 | 1.2 | 0.2 | 0.7 |
| $H_2^{R2}$ (ppm) | 10 | 0.8 | 2 | 0.8 | 1 | 0.9 |
| $H_2^{R3}$ (ppm) | 0 | 0 | 0 | 0 | 0 | 0 |
| Prod. Rate (kg/h) | 98.2 | 76 | 84 | 76 | 92.3 | 76.3 |
| Increase in Prod. Rate (%) | 29.2 | | 10.5 | | 20.9 | |

TABLE 3C

Additional solution process parameters for Examples 9-11 and Comparative Examples 5-7.

| Process Parameter | Example 9 | Comparative Example 5 | Example 10 | Comparative Example 6 | Example 11 | Comparative Example 7 |
|---|---|---|---|---|---|---|
| R1 total solution rate (kg/h) | 368.3 | 358.1 | 414.2 | 420.3 | 382.3 | 352.6 |
| R2 total solution rate (kg/h) | 231.7 | 241.9 | 185.8 | 179.7 | 217.7 | 247.4 |
| R3 solution rate (kg/h) | 0 | 0 | 0 | 0 | 0 | 0 |
| Overall total solution rate (kg/h) | 600 | 600 | 600 | 600 | 600 | 600 |
| R1 inlet temp (° C.) | 30 | 30 | 30 | 30 | 30 | 30 |
| R2 inlet temp (° C.) | 30 | 30 | 30 | 30 | 30 | 30 |
| R3 inlet temp(° C.) | 130 | 130 | 130 | 130 | 130 | 130 |
| R1 Mean temp (° C.) | 140.2 | 136.7 | 135.6 | 130 | 134.8 | 140.5 |
| R2 Mean temp (° C.) | 208.7 | 188 | 189.3 | 190 | 198.7 | 182 |
| R3 exit temp (actual) (° C.) | 215.7 | 191 | 201.9 | 190.1 | 209.9 | 187.8 |
| R3 exit temp (calc) (° C.) | 222.1 | 190.7 | 201.3 | 192 | 210.2 | 182.7 |
| $Q^{R1}$ (%) | 78.2 | 79 | 94 | 86.1 | 82 | 80.7 |
| $Q^{R2}$ (%) | 80 | 81 | 77.5 | 82.5 | 80 | 87.8 |
| $Q^{R2+R3}$ (%) | 91.6 | 84.6 | 90.1 | 85.5 | 90.8 | 89.3 |
| $Q^{R3}$ (%) | 58.2 | 19 | 56.2 | 17 | 54 | 12 |
| $Q^{T}$ (%) | 94.3 | 90.1 | 93.9 | 91.1 | 93.8 | 93.6 |
| Prod. Rate (kg/h) | 98.2 | 76 | 84 | 76 | 92.3 | 76.3 |
| Increase in Prod. Rate (%) | 29.2 | | 10.5 | | 20.9 | |

TABLE 4A

Continuous solution process catalyst parameters for: Example 12 and Comparative Example 8, targeting ethylene interpolymer products at 1.0 $I_2$ and 0.917 g/cm³.

| Process Parameter | Example 12 | Comparative Example 8 |
|---|---|---|
| R1 Catalyst | PIC-2 | PIC-2 |
| R2 Catalyst | ZN | PIC-2 |
| R1 (i) (ppm) | 0.21 | 0.14 |
| R1 (ii)/(i) mole ratio | 40 | 100 |
| R1 (iv)/(ii) mole ratio | 0.1 | 0.5 |
| R1 (iii)/(i) mole ratio | 1.23 | 1.2 |
| R2 (i) (ppm) | 0 | 0.38 |
| R2 (ii)/(i) mole ratio | 0 | 30 |
| R2 (iv)/(ii) mole ratio | 0 | 0.5 |
| R2 (iii)/(i) mole ratio | 0 | 1.5 |
| R2 (vii) (ppm) | 4.7 | 0 |
| R2 (vi)/(v) mole ratio | 2.02 | 0 |
| R2 (viii)/(vii) mole ratio | 1.35 | 0 |
| R2 (ix)/(vii) mole ratio | 0.35 | 0 |
| Prod. Rate (kg/h) | 85.9 | 76.7 |
| Increase in Prod. Rate (%) | 12% | |

TABLE 4B

Additional solution process parameters for Example 12 and Comparative Example 8.

| Process Parameter | Example 12 | Comparative Example 8 |
|---|---|---|
| R3 volume (L) | 18 | 2.2 |
| $ES^{R1}$ (%) | 40 | 50 |
| $ES^{R2}$ (%) | 60 | 50 |
| $ES^{R3}$ (%) | 0 | 0 |
| R1 ethylene concentration (wt %) | 8.3 | 9.1 |
| R2 ethylene concentration (wt %) | 14.1 | 13.4 |
| R3 ethylene concentration (wt %) | 14.1 | 0 |

TABLE 4B-continued

Additional solution process parameters for Example 12 and Comparative Example 8.

| Process Parameter | Example 12 | Comparative Example 8 |
|---|---|---|
| ((1-octene)/(ethylene))$^{R1}$ (wt %) | 0.38 | 0.37 |
| $OS^{R1}$ (%) | 100 | 100 |
| $OS^{R2}$ (%) | 0 | 0 |
| $OS^{R3}$ (%) | 0 | 0 |
| $H_2^{R1}$ (ppm) | 0.2 | 0.5 |
| $H_2^{R2}$ (ppm) | 6.9 | 0.5 |
| $H_2^{R3}$ (ppm) | 0 | 0 |
| Prod. Rate (kg/h) | 85.9 | 76.7 |
| Increase in Prod. Rate (%) | 12% | |

TABLE 4C

Additional solution process parameters for Example 12 and Comparative Example 8.

| Process Parameter | Example 12 | Comparative Example 8 |
|---|---|---|
| R1 total solution rate (kg/h) | 407.4 | 439.8 |
| R2 total solution rate (kg/h) | 192.6 | 160.2 |
| R3 solution rate (kg/h) | 0 | 0 |
| Overall total solution rate (kg/h) | 600 | 600 |
| R1 inlet temp (° C.) | 30 | 30 |
| R2 inlet temp (° C.) | 30 | 30 |
| R3 inlet temp(° C.) | 130 | 130 |
| R1 Mean temp (° C.) | 135 | 141 |
| R2 Mean temp (° C.) | 193 | 191 |

TABLE 4C-continued

Additional solution process parameters for
Example 12 and Comparative Example 8.

| Process Parameter | Example 12 | Comparative Example 8 |
|---|---|---|
| R3 exit temp (actual) (° C.) | 207 | 186 |
| R3 exit temp (calc) (° C.) | 204 | 193 |
| $Q^{R1}$ (%) | 91 | 89 |
| $Q^{R2}$ (%) | 80 | 79 |
| $Q^{R2+R3}$ (%) | 91 | 81.5 |
| $Q^{R3}$ (%) | 55 | 12 |
| $Q^{T}$ (%) | 94.3 | 89.7 |
| Prod. Rate (kg/h) | 85.9 | 76.7 |
| Increase in Prod. Rate (%) | 12% | |

TABLE 5

Physical properties of disclosed Examples and Comparative Examples.

| Example | Supporting Process Data | Density (g/cm³) | Melt Index $I_2$ (g/10 min) | Stress Exponent | $M_w$ | $M_w/M_n$ | $CDBI_{50}$ |
|---|---|---|---|---|---|---|---|
| Example 1 | Tables | 0.9169 | 0.88 | 1.23 | 109444 | 3.09 | 74.8 |
| Example 2 | 1A-1C | 0.9160 | 1.04 | 1.26 | 104966 | 3.66 | 71.6 |
| Example 3 | | 0.9164 | 0.90 | 1.27 | 111344 | 3.78 | 67.3 |
| Example 4 | | 0.9154 | 0.97 | 1.33 | 109146 | 4.20 | 67.1 |
| Example 5 | | 0.9163 | 1.04 | 1.23 | 110808 | 3.39 | 67.5 |
| Comp. Example 1 | | 0.9152 | 1.04 | 1.28 | 97646 | 3.44 | 75.0 |
| Comp. Example 2 | | 0.9147 | 1.06 | 1.29 | 92762 | 3.15 | 73.7 |
| Example 6 | Tables | 0.9152 | 0.67 | 1.23 | 113893 | 2.87 | 69.0 |
| Example 7 | 2A-2C | 0.9155 | 0.70 | 1.24 | 114401 | 3.88 | 65.7 |
| Comp. Example 3 | | 0.9150 | 0.58 | 1.27 | 112210 | 2.79 | 74.0 |
| Example 8 | Tables | 0.9176 | 4.64 | 1.25 | 70452 | 3.83 | 68.2 |
| Comp. Example 4 | 2A-2C | 0.9154 | 4.10 | 1.23 | 68320 | 2.41 | 80.7 |
| Example 9 | Tables | 0.9190 | 0.91 | 1.38 | 112368 | 4.00 | 68.9 |
| Comp. Example 5 | 3A-3C | 0.9197 | 0.85 | 1.28 | 101971 | 2.67 | 85.6 |
| Example 10 | Tables | 0.9232 | 0.94 | 1.24 | 110036 | 2.60 | 53.6 |
| Comp. Example 6 | 3A-3C | 0.9233 | 0.82 | 1.21 | n/a | n/a | n/a |
| Example 11 | Tables | 0.9113 | 0.91 | 1.24 | 109556 | 2.86 | 71.6 |
| Comp. Example 7 | 3A-3C | 0.9112 | 1.02 | 1.30 | 97302 | 4.09 | n/a |
| Example 12 | Tables | 0.9171 | 1.11 | 1.23 | 103551 | 2.42 | 33.2 |
| Comp. Example 8 | 4A-4C | 0.9162 | 0.96 | 1.30 | 94536 | 2.88 | 92.1 |
| Comp. Example A | n/a | 0.9176 | 0.86 | 1.26 | 99674 | 3.34 | 73.5 |
| Comp. Example B | n/a | 0.9179[a] | 1.0 | 1.33 | 98469 | 2.74 | 57.1 |
| Comp. Example C | n/a | 0.9161 | 1.0 | 1.35 | 102142 | 2.63 | 62.8 |
| Comp. Example D | n/a | 0.9171 | 4.1 | 1.22 | 67106 | 2.21 | 83.2 |

[a]Base resin density 0.9165 g/cm³ (corrected); as supplied Comparative B contains 2500 ppm of antiblock.

TABLE 6

Neutron Activation Analysis data for Examples 2, 5 and 8 and Comparative Example D.

| Example | Density (g/cm³) | Melt Index $I_2$ (g/10 min) | Ti (ppm) | Al (ppm) | Mg (ppm) |
|---|---|---|---|---|---|
| Example 2 | 0.9160 | 1.04 | 7.4 ± 0.4 | 97 ± 4 | 199 ± 8 |
| Example 5 | 0.9163 | 1.04 | 6.7 ± 0.6 | 140 ± 6 | 287 ± 12 |
| Example 8 | 0.9176 | 4.64 | 7.6 ± 0.5 | 177 ± 7 | 365 ± 15 |
| Comparative Example D | 0.9171 | 4.10 | 0.35 ± 0.04 | 9.1 ± 0.4 | <1 [a] |

[a] undetectable level of magnesium

TABLE 7A

Computer generated Simulated Example 13: single-site catalyst formulation in R1 (PIC-1); in-line Ziegler-Natta catalyst formulation in R2; R3 4.8 gallons (18L); production rate 90.9 kg/hr, and; R3 outlet temperature 217.1° C.

| Simulated Physical Property | Reactor 1 (R1) First Ethylene Interpolymer | Reactor 2 (R2) Second Ethylene Interpolymer | Reactor 3 (R3) Third Ethylene Interpolymer | Simulated Example 13 |
|---|---|---|---|---|
| Weight Percent (%) | 36.2 | 56.3 | 7.5 | 100 |
| $M_n$ | 63806 | 25653 | 20520 | 31963 |
| $M_w$ | 129354 | 84516 | 67281 | 99434 |
| $M_z$ | 195677 | 198218 | 162400 | 195074 |
| Polydispersity ($M_w/M_n$) | 2.03 | 3.29 | 3.28 | 3.11 |
| Branch Frequency ($C_6$ Branches per 1000C) | 12.6 | 11.4 | 15.6 | 12.1 |
| $CDBI_{50}$ (%) (range) | 90 to 95 | 55 to 60 | 45 to 55 | 65 to 70 |
| Density (g/cm³) | 0.9087 | 0.9206 | 0.9154 | 0.9169 |
| Melt Index (dg/min) | 0.31 | 1.92 | 4.7 | 1.0 |

TABLE 7B

Computer generated Simulated Comparative Example 9:
single-site catalyst formulation in R1 (PIC-1) and R2
(PIC-1); R3 4.8 gallons (18 L); production rate 82.6 kg/hr, and;
R3 outlet temperature 200.2° C.

| Simulated Physical Property | Reactor 1 (R1) First Ethylene Interpolymer 1 | Reactor 2 (R2) Second Ethylene Interpolymer 2 | Reactor 3 (R3) Third Ethylene Interpolymer 3 | Simulated Comparative Example 9 |
|---|---|---|---|---|
| Weight Percent (%) | 45.1 | 49.9 | 5.0 | 100 |
| $M_n$ | 91365 | 15325 | 9440 | 23386 |
| $M_w$ | 186753 | 30650 | 20424 | 100602 |
| $M_z$ | 283433 | 45975 | 32901 | 244909 |
| Polydispersity ($M_w/M_n$) | 2.04 | 2.00 | 2.16 | 4.30 |
| Branch Frequency ($C_6$ Branches per 1000C) | 13.2 | 14.1 | 18.7 | 13.9 |
| $CDBI_{50}$ (%) (range) | 90 to 95 | 80 to 90 | 70 to 75 | 65 to 75 |
| Density (g/cm$^3$) | 0.9038 | 0.9213 | 0.9186 | 0.9170 |
| Melt Index (dg/min) | 0.8 | 89.0 | 446 | 1.02 |

TABLE 8

Blown film processing conditions targeting 1.0 mil (25 μm) film and output rate of 100 lb/hr.

| Processing Parameter | Units | Example 2 | Example 5 | Comparative Example A | Comparative Example B | Comparative Example C |
|---|---|---|---|---|---|---|
| Processing Aid | Ppm | 800 | 800 | 0 | 0 | 0 |
| Output (lbs/hr) | lb/hr | 100 | 100 | 100 | 100 | 100 |
| Barrel Zone 1 | ° F. | 420 | 420 | 420 | 420 | 420 |
| Barrel Zone 2 | ° F. | 400 | 400 | 400 | 400 | 400 |
| Barrel Zone 3 | ° F. | 400 | 400 | 400 | 401 | 401 |
| Barrel Zone 4 | ° F. | 400 | 400 | 400 | 400 | 400 |
| Adapter Zone 9 | ° F. | 420 | 420 | 420 | 420 | 420 |
| Block Zone 10 | ° F. | 420 | 420 | 420 | 420 | 420 |
| Die Zone 11 | ° F. | 420 | 420 | 420 | 420 | 420 |
| Die Zone 12 | ° F. | 440 | 440 | 440 | 440 | 440 |
| Melt Temperature | ° F. | 426 | 426 | 431 | 430 | 428 |
| Extruder Pressure | Psi | 3920 | 3725 | 3778 | 4205 | 4070 |
| Extruder Current | Amp | 36.3 | 36.0 | 38.3 | 36.4 | 37.5 |
| Extruder Voltage | Volt | 190 | 188 | 190 | 190 | 185 |
| Magnehelic Gauge | in/H$_2$O | 9.8 | 12.0 | 12.3 | 10.0 | 10.0 |
| Screw Speed | Rpm | 41 | 40 | 41 | 42 | 41 |
| Nip Roll Speed | ft/min | 130 | 130 | 130 | 130 | 132 |
| Frost Line Height | In | 16 | 16 | 16 | 16 | 17 |
| Specific Output | lb/(hr · rpm) | 2.4 | 2.5 | 2.4 | 2.4 | 2.4 |
| Specific Power | lb/(hr · amp) | 2.8 | 2.8 | 2.6 | 2.7 | 2.7 |
| Specific Energy | W/lb/hr | 69.0 | 67.7 | 72.8 | 69.2 | 69.4 |

TABLE 9A

Physical properties of Examples and Comparative Example blown films;
film thickness 1.0 mil (25 μm) unless indicated otherwise.

| Physical Property | Units | Method | Example 2 | Example 5 | Comparative Example A | Comparative Example B | Comparative Example C |
|---|---|---|---|---|---|---|---|
| Film Thickness | mil | Micrometer | 1.03 | 1.07 | 1.01 | 1.02 | 1.00 |
| Dart Impact | g/mil | ASTM D1709 Method A | 569 | 746 | 478 | 478 | 556 |
| Lubricated Puncture | J/mm | In-house | 74 | 79 | 66 | 30 | 99 |
| Puncture | J/mm | ASTM D5748 | 71 | n/a | 72 | 18 | 119 |
| Dynatup Max Load | Lb | In-house | 6.23 | n/a | 5.54 | 5.46 | 6.03 |
| Dynatup Total Energy | ft · lb | In-house | 0.99 | n/a | 0.51 | 0.58 | 1.02 |

TABLE 9A-continued

Physical properties of Examples and Comparative Example blown films; film thickness 1.0 mil (25 μm) unless indicated otherwise.

| Physical Property | Units | Method | Example 2 | Example 5 | Comparative Example A | Comparative Example B | Comparative Example C |
|---|---|---|---|---|---|---|---|
| Dynatup Energy at Max Load | ft · lb | In-house | 0.84 | n/a | 0.5 | 0.57 | 0.93 |
| Tear MD | g/mil | ASTM D1922 | 300 | 291 | 314 | 261 | 288 |
| Tear TD | g/mil | ASTM D1922 | 541 | 524 | 488 | 477 | 470 |
| Puncture Propagation MD | N | ASTM D2582 | 19.4 | n/a | 19.7 | 18.6 | n/a |
| Puncture Propagation TD | N | ASTM D2582 | 22.0 | n/a | 21.7 | 20.8 | n/a |
| Gloss at 45° | | ASTM D2457 | 80.0 | 82.2 | 47.9 | 66.5 | 74.8 |
| Haze | % | ASTM D1003 | 4.4 | 3.5 | 10.8 | 8.7 | 4.6 |
| Film Hexane Extractables [a] | wt % | 21 CFR §177.1520 | 1.01 | 1.02 | 0.62 | 0.63 | 0.64 |
| Tack Onset @ 1.0N [b] | °C. | In-house | 100 | 96.6 | 104.6 | 96 | 92 |
| Max Hot tack Strength [b] | N | In-house | 4.5 | 4.3 | 4.6 | 4.1 | 4.6 |
| Temperature Max. Hot tack [b] | °C. | In-house | 125 | 115 | 125 | 130 | 115 |
| S.I.T. @ 4.4N/13 mm [b] | °C. | In-house | 98 | 100 | 97 | 99 | 96 |

[a] = 3.5 mil film (89 μm)
[b] = 2.0 mil film (51 μm)

TABLE 9B

Physical properties of Examples and Comparative Example blown films; film thickness were 1.0 mil (25 μm).

| Physical Property | Units | Method | Example 2 | Example 5 | Comparative Example A | Comparative Example B | Comparative Example C |
|---|---|---|---|---|---|---|---|
| Film Thickness | mil | Micrometer | 1.03 | 1.07 | 1.01 | 1.02 | 1.00 |
| 1% Sec Modulus MD | MPa | In-house | 164 | 136 | 136 | 147 | 155 |
| 1% Sec Modulus TD | MPa | In-house | 177 | 158 | 143 | 169 | 160 |
| 2% Sec Modulus MD | MPa | In-house | 147 | 128 | 120 | 127 | 133 |
| 2% Sec Modulus TD | MPa | In-house | 150 | 138 | 125 | 141 | 132 |
| Avg. 2% Sec Modulus | MPa | In-house | 149 | 133 | 123 | 134 | 133 |
| Tensile Break Str MD | MPa | ASTM D882 | 50.5 | 55.1 | 46.2 | 35.2 | 50.1 |
| Tensile Break Str TD | MPa | ASTM D882 | 49 | 51.8 | 40.4 | 31.7 | 46.1 |
| Elongation at Break MD | % | ASTM D882 | 536 | 551 | 539 | 468 | 536 |
| Elongation at Break TD | % | ASTM D882 | 757 | 782 | 753 | 662 | 752 |
| Tensile Yield Str MD | MPa | ASTM D882 | 9.1 | 9.2 | 8.5 | 8.6 | 9.4 |
| Tensile Yield Str TD | MPa | ASTM D882 | 9.4 | 9.1 | 8.6 | 8.8 | 9.2 |
| Tensile Elong at Yield MD | % | ASTM D882 | 14 | 14 | 14 | 15 | 14 |
| Tensile Elong at Yield TD | % | ASTM D882 | 15 | 15 | 22 | 22 | 16 |
| Film Toughness, Total Energy to Break MD | ft · lb /in$^3$ | ASTM D882 | 1198 | 1319 | 1110 | 927 | 1306 |
| Film Toughness, Total Energy to Break TD | ft · lb /in$^3$ | ASTM D882 | 1198 | 1727 | 1408 | 1078 | 1551 |
| Film Toughness, Avg. Total Energy to Break | ft · lb /in$^3$ | ASTM D882 | 1198 | 1523 | 1259 | 1003 | 1429 |

What is claimed is:

1. A continuous solution polymerization process comprising:
   i) injecting ethylene, a process solvent, a single site catalyst formulation, optionally one or more α-olefins and optionally hydrogen into a first reactor to produce a first exit stream containing a first ethylene interpolymer in said process solvent;
   ii) injecting ethylene, said process solvent, a first heterogeneous catalyst formulation, optionally one or more α-olefins and optionally hydrogen into a second reactor to produce a second exit stream containing a second ethylene interpolymer in said process solvent;
   iii) combining said first and said second exit streams to form a third exit stream;
   iv) passing said third exit stream into a third reactor and optionally injecting into said third reactor, ethylene, said process solvent, one or more α-olefins, hydrogen and a second heterogeneous catalyst formulation to produce a fourth exit stream containing a third ethylene interpolymer, said second ethylene interpolymer and said first ethylene interpolymer in said process solvent;
   v) phase separating said fourth exit stream to recover an ethylene interpolymer product comprising said first ethylene interpolymer, said second ethylene interpolymer and said third ethylene interpolymer;
   wherein said third reactor is a tubular reactor;
   wherein, the production rate is increased at least about 9% relative to a continuous solution polymerization process wherein said first heterogeneous catalyst formulation is replaced with said single site catalyst formulation; wherein production rate is measured in kilograms of said ethylene interpolymer product produced per hour;
   wherein said single site catalyst formulation comprises:
   a) a component (i) defined by the formula

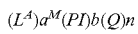

$(L^A)_a M(PI)_b(Q)_n$ wherein $L^A$ is selected from the group consisting of unsubstituted cyclopentadienyl, substituted cyclopentadienyl, unsubstituted indenyl, substituted indenyl, unsubstituted fluorenyl and substituted fluorenyl;
   M is a metal selected from titanium, hafnium and zirconium;
   PI is a phosphinimine ligand;
   Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals are unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and
   (a+b+n) is equivalent to the valence of the metal M;
   b) an alumoxane co-catalyst;
   c) an boron ionic activator, and;
   d) optionally, a hindered phenol;
   wherein said first and said optional second heterogeneous catalyst formulation comprises a metal compound defined by the formulas $M(X)_n$ or $MO(X)_n$, wherein M is selected from the group comprising titanium, zirconium and hafnium, O represents oxygen, X represents chloride or bromide and n is an integer that satisfies the oxidation state of the metal M; and
   wherein the production rate, for comparison purposes, is determined using a continuous solution polymerization process using methylpentane as process solvent, reactors arranged in series, a first reactor volume of 3.2 gallons, a second reactor volume of 5.8 gallons, the third reactor being a tubular reactor having a volume of 0.58 gallons, the pressure in the first reactor of from about 14 MPa to about 18 MPa, the pressure in the second reactor being lower than the pressure in the first reactor, an average residence time of the solvent in the first reactor of about 61 seconds, an average residence time of the second reactor of about 73 seconds, an average residence time in the third reactor of about 7.3 seconds, and adjusting all other conditions to provide an ethylene interpolymer product having a melt index of about 1 (ASTM D1239, 2.16 kg load, 190° C.) and density of about 0.917 g/cm³ (ASTM D792).

2. The process of claim 1 further comprising:
   a) optionally adding a catalyst deactivator A to said third exit stream, downstream of said first and said second reactor, forming a deactivated solution A;
   b) adding a catalyst deactivator B to said fourth exit stream, downstream of said third reactor, forming a deactivated solution B; with the proviso that step b) is skipped if said catalyst deactivator A is added in step a);
   c) phase separating said deactivated solution A or B to recover said ethylene interpolymer product;
   wherein, the production rate is increased at least about 9% relative to a continuous solution polymerization process wherein said first heterogeneous catalyst formulation is replaced with said single site catalyst formulation.

3. The process of claim 2 further comprising:
   a) adding a passivator to said deactivated solution A or B forming a passivated solution, and;
   b) phase separating said passivated solution to recover said ethylene interpolymer product;
   wherein, the production rate is increased at least about 9% relative to a continuous solution polymerization process wherein said first heterogeneous catalyst formulation is replaced with said single site catalyst formulation.

4. The process of claim 1 wherein a molar ratio of said boron ionic activator to said component (i) in said first reactor is from about 0.1:1 to about 10:1; a molar ratio of said alumoxane co-catalyst to said component (i) in said first reactor is from about 1:1 to about 1000:1, and; a molar ratio of said optional hindered phenol to said alumoxane co-catalyst in said first reactor is from 0.0:1 to about 10:1.

5. The process of claim 1 wherein said alumoxane co-catalyst is a methylalumoxane (MAO).

6. The process of claim 1 wherein said boron ionic activator is trityl tetrakis (pentafluoro-phenyl) borate.

7. The process of claim 3 wherein said first and said second heterogeneous catalyst formulations are a first and a second in-line Ziegler-Natta catalyst formulation.

8. The process of claim 7 wherein said first and said second in-line Ziegler-Natta catalyst formulations are formed in an in-line process comprising:
   i) forming a first product mixture in a first heterogeneous catalyst assembly by combining a stream S1 and a stream S2 and allowing said first product mixture to equilibrate for a HUT-1 seconds; wherein said stream S1 comprises a magnesium compound and an aluminum alkyl in said process solvent and said stream S2 comprises a chloride compound in said process solvent;

ii) forming a second product mixture in said first heterogeneous catalyst assembly by combining said first product mixture with a stream S3 and allowing said second product mixture to equilibrate for a HUT-2 seconds; wherein said stream S3 comprises a metal compound in said process solvent;

iii) forming said first and said second in-line Ziegler-Natta catalyst formulation in said first heterogeneous catalyst assembly by combining said second product mixture with a stream S4 and allowing said first and said second in-line Ziegler-Natta catalyst formulations to equilibrate for a HUT-3 seconds prior to injection into said second reactor and optional injection into said third reactor, wherein said stream S4 comprises an alkyl aluminum co-catalyst in said process solvent;

iv) optionally, step iii) is skipped and said first and said second in-line Ziegler-Natta catalyst formulations are formed inside said second reactor and optionally inside said third reactor; wherein, said second product mixture is equilibrated for an additional HUT-3 seconds and injected into said second reactor and optionally into said third reactor, and said stream S4 is independently injected into said second reactor and optionally into said third reactor, and;

v) optionally, said second in-line Ziegler-Natta catalyst formulation is formed by conducting steps i) through iii) and optional step iv) in a second heterogeneous catalyst assembly, wherein the second in line Ziegler-Natta catalyst formulation is formed and injected into said third reactor.

9. The process of claim 8 wherein said HUT-1 is from about 5 seconds to about 70 seconds, said HUT-2 is from about 2 seconds to about 50 seconds and said HUT-3 is from about 0.5 to about 15 seconds.

10. The process of claim 8 wherein;
i) said magnesium compound is defined by the formula $Mg(R^1)_2$, wherein the $R^1$ groups are the same or different;
ii) said aluminum alkyl is defined by the formula $Al(R^3)_3$, wherein the $R^3$ groups are the same or different;
iii) said chloride compound is defined by the formula $R^2Cl$;
iv) said metal compound is defined by the formulas $M(X)_n$ or $MO(X)_n$, wherein M represents titanium, zirconium, hafnium, vanadium, niobium, tantalum, chromium, molybdenum, tungsten, manganese, technetium, rhenium, iron, ruthenium, osmium or mixtures thereof, O represents oxygen, X represents chloride or bromide and n is an integer that satisfies the oxidation state of the metal M, and;
v) said alkyl aluminum co-catalyst is defined by the formula $Al(R^4)_p(OR^5)_q(X)_r$, wherein the $R^4$ groups may be the same or different, the $OR^5$ groups are the same or different and (p+q+r)=3, with the proviso that p is greater than 0;
wherein $R^1$, $R^2$, $R^3$, $R^4$ and $R^5$ represent hydrocarbyl groups having from 1 to 10 carbon atoms; optionally $R^2$ may be a hydrogen atom.

11. The process of claim 10 wherein M in said metal compound represents titanium, zirconium, hafnium, vanadium, chromium or mixtures thereof.

12. The process of claim 8 wherein a molar ratio of said aluminum alkyl to said magnesium compound in said second and said third reactor is from about 3.0:1 to about 70:1; a molar ratio of said chloride compound to said magnesium compound in said second and said third reactor is from about 1.0:1 to about 4.0:1; a molar ratio of said alkyl aluminum co-catalyst to said metal compound in said second and said third reactor is from about 0:1 to about 10:1, and; a molar ratio of said aluminum alkyl to said metal compound in said second and said third reactor is from about 0.05:1 to about 2:1.

13. The process of claim 3 wherein said first and said second heterogeneous catalyst formulations are a first and a second batch Ziegler-Natta catalyst formulation.

14. The process of claim 13 wherein said first and said second batch Ziegler-Natta catalyst formulations are formed in a batch process comprising:
i) forming said first batch Ziegler-Natta catalyst formulation by combining a stream S5 and a stream S4 and injecting said first batch Ziegler-Natta catalyst formulation into said second reactor, wherein said stream S4 comprises an alkyl aluminum co-catalyst in said process solvent and stream S5 comprises a first batch Ziegler-Natta procatalyst in said process solvent;
ii) optionally forming said second batch Ziegler-Natta catalyst formulation by combining a stream S6 and said stream S4 and optionally injecting said second batch Ziegler-Natta catalyst formulation into said third reactor, wherein said stream S6 comprises a second batch Ziegler-Natta procatalyst in said process solvent;
iii) optionally, steps i) and ii) are skipped and said first batch Ziegler-Natta catalyst formulation and said optional second batch Ziegler-Natta catalyst formulation are formed inside said reactors; wherein, said stream S5 is injected into said second reactor and optionally said stream S6 is injected into said third reactor and said stream S4 is independently injected into said second reactor and optionally into said third reactor;
iv) optionally said second batch Ziegler-Natta catalyst formulation is formed by combining said stream S5 and said stream S4 and optionally injecting said second batch Ziegler-Natta catalyst formulation into said third reactor; or said second batch Ziegler-Natta catalyst formulation is formed inside said third reactor by independently injecting said stream S5 and said stream S4 into said third reactor.

15. The process of claim 14 wherein said alkyl aluminum co-catalyst is defined by the formula $Al(R^4)_p(OR^5)_q(X)_r$, wherein the $R^4$ groups are the same or different, the $OR^5$ groups are the same or different and (p+q+r)=3, with the proviso that p is greater than 0; wherein $R^4$ and $R^5$ represent hydrocarbyl groups having from 1 to 10 carbon atoms.

16. The process of claim 14 wherein said first and second batch Ziegler-Natta procatalysts comprise:
i) a magnesium compound defined by the formula $Mg(R^1)_2$, wherein the $R^1$ groups are the same or different;
ii) a chloride compound defined by the formula $R^2Cl$;
iii) optionally an aluminum alkyl halide defined by the formula $(R^6)_vAlX_{3-v}$; wherein the $R^6$ groups are the same or different, X represents chloride or bromide, and v is 1 or 2,
iv) a metal compound defined by the formulas $M(X)_n$ or $MO(X)_n$, wherein M represents titanium, zirconium, hafnium, vanadium, niobium, tantalum, chromium, molybdenum, tungsten, manganese, technetium, rhenium, iron, ruthenium, osmium or mixtures thereof, 0 represents oxygen, X represents chloride or bromide and n is an integer that satisfies the oxidation state of the metal M, and;

wherein $R^1$, $R^2$ and $R^6$ represent hydrocarbyl groups having from 1 to 10 carbon atoms; optionally $R^2$ is a hydrogen atom.

17. The process of claim 16 wherein M in said metal compound represents titanium, zirconium, hafnium, vanadium, chromium or mixtures thereof.

18. The process of claim 16 wherein a molar ratio of said chloride compound to said magnesium compound in said batch Ziegler-Natta procatalyst is from about 2:1 to about 3:1;
wherein a molar ratio of said magnesium compound to said metal compound in said procatalyst is from 5:1 to about 10:1;
wherein a molar ratio of said aluminum alkyl halide to said magnesium compound in said procatalyst is from about 0:1 to about 0.5:1, and; wherein a molar ratio of said alkyl aluminum co-catalyst to said metal compound in said procatalyst is from about 0.5:1 to about 10:1.

19. The process of claim 3 wherein said process solvent is one or more $C_5$ to $C_{12}$ alkanes.

20. The process of claim 3 wherein said first, second and third reactors operate at a temperature from about 80° C. to about 300° C. and a pressure from about 3 MPag to about 45 MPag.

21. The process of claim 3 wherein said process solvent in said first reactor has an average reactor residence time from about 10 seconds to about 600 seconds and said process solvent in said second reactor has an average reactor residence time from about 10 seconds to about 720 seconds.

22. The process of claim 3 wherein a reactor temperature difference ($T^{R2}$-$T^{R1}$) ranges from about 1° C. to about 120° C.; wherein $T^{R2}$ is the temperature of the solution in said second reactor and $T^{R1}$ is the temperature of the solution in said first reactor.

23. The process of claim 3 wherein said optional one or more α-olefins are $C_3$ to $C_{10}$ α-olefins.

24. The process of claim 3 wherein said optional α-olefin is 1-hexene or 1-octene or a mixture of 1-hexene and 1-octene.

* * * * *